(12) United States Patent
Figotin et al.

(10) Patent No.: US 7,072,555 B1
(45) Date of Patent: Jul. 4, 2006

(54) SYSTEMS AND METHODS FOR TRANSMITTING ELECTROMAGNETIC ENERGY IN A PHOTONIC DEVICE

(75) Inventors: Aleksandr Figotin, Irvine, CA (US); Ilya Vitebskiy, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/839,117

(22) Filed: May 3, 2004

Related U.S. Application Data

(60) Provisional application No. 60/467,492, filed on May 1, 2003.

(51) Int. Cl.
*G02B 6/10* (2006.01)

(52) U.S. Cl. .................................. 385/129; 385/131
(58) Field of Classification Search ............... 385/31, 385/129–132; 359/237
See application file for complete search history.

(56) References Cited

U.S. PATENT DOCUMENTS

| | | | |
|---|---|---|---|
| 5,365,541 A | 11/1994 | Bullock | |
| 5,559,825 A | 9/1996 | Scalora et al. | |
| 5,689,275 A | 11/1997 | Moore et al. | |
| 5,751,466 A | 5/1998 | Dowling et al. | |
| 5,999,308 A | 12/1999 | Nelson et al. | |
| 6,130,780 A | 10/2000 | Joannopoulos et al. | |
| 6,134,043 A | 10/2000 | Johnson et al. | |
| 6,414,780 B1 | 7/2002 | D'Aguanno et al. | |
| 6,701,048 B1 | 3/2004 | Figotin et al. | |
| 6,825,982 B1* | 11/2004 | Ting | 359/580 |
| 2002/0018298 A1* | 2/2002 | Miller et al. | 359/583 |
| 2004/0008928 A1* | 1/2004 | Gerken et al. | 385/24 |
| 2004/0013361 A1* | 1/2004 | Chen et al. | 385/31 |
| 2004/0218651 A1* | 11/2004 | Iwasaki et al. | 372/69 |

OTHER PUBLICATIONS

M. G. Krein et al., "Four Papers on Ordinary Differential Equations", American Mathematical Society Translations, Providence, R.I., Series 2, vol. 120, pp. 1-70 (1983).

(Continued)

*Primary Examiner*—Sung Pak
(74) *Attorney, Agent, or Firm*—Orrick, Herrington & Sutcliffe LLP

(57) ABSTRACT

Systems and methods are provided that allow transmission of an electromagnetic wave in and through a periodic multilayered photonic device. The photonic device preferably is a periodic stack of plane-parallel layers with at least one them displaying dielectric anisotropy with a principle anisotropic axis forming an oblique angle with the normal to the layers. The wave obliquely incident on the surface of the device can be almost completely converted into an axially frozen mode characterized by a significantly increased amplitude, decreased group velocity normal to the incident surface and increased energy flux substantially tangential to the incident surface. The photonic device can be used in numerous applications over a wide range of frequencies up to and including the ultraviolet spectrum. The photonic device can be further configured with a deflection device which substantially increases the operational frequency range of the photonic device.

28 Claims, 9 Drawing Sheets

OTHER PUBLICATIONS

A. Figotin et al., "Electromagnetic Unidirectionality in Magnetic Photonic Crystals", Physical Review B 67, 165210 (2003), pp. 1-20.

A. Figotin et al., "Nonreciprocal Magnetic Photonic Crystals", Physical Review E., vol. 63, 066609 (2001), pp. 1-17.

I. Abdulhalim, "Analytic propagation matrix method for anisotropic magneto-optic layered media", J. Opt A: Pure Appl. Opt. 2 (2000), pp. 557-564.

I. Abdulhalim, "Analytic propagation matrix method for linear optics of arbitrary biaxial layered media", J. Opt A: Pure Appl. Opt. 1 (1999), pp. 646-653.

Dwight W. Berreman, "Optics in Stratified And Anisotropic Media: 4×4-Matrix Formulation", Journal of the Optical Society of America, vol. 62, No. 4 (Apr. 1972), pp. 502-510.

A. Figotin et al., "Oblique Frozen Modes in Periodic Layered Media", Physical Review E 68, 036609 (2003), pp. 1-16.

* cited by examiner

| Calcite (Iceland spar, CaCO$_3$) | | | |
|---|---|---|---|
| Refractive Indices | | Birefringence | Walk-off Angle @ 45 degrees (um = micrometer) |
| n$_e$ | n$_o$ | delta n = n$_e$ - n$_o$ | rho (r) |
| 1.6557 | 1.4852 | -0.1705 | 0.63 |
| 1.6629 | 1.4885 | -0.1744 | 1.30 |
| Yttrium Vanadate (YVO$_4$) | | | |
| Refractive Indices | | Birefringence | Walk-off Angle @ 45 degrees (um = micrometer) |
| n$_e$ | n$_o$ | delta n = n$_e$ - n$_o$ | rho (r) |
| 1.9929 | 2.2154 | 0.2225 | r = 6.04° at 0.63um |
| 1.9500 | 2.1554 | 0.2054 | r = 5.72° at 1.30um |
| 1.9447 | 2.1486 | 0.2039 | r = 5.69° at 1.55um |
| BBO (a - BaB$_2$O$_4$) | | | |
| Refractive Indices | | Birefringence | Walk-off Angle @ 45 degrees (um = micrometer) |
| n$_e$ | n$_o$ | delta n = n$_e$ - n$_o$ | rho (r) |
| 1.58462 | 1.65790 | -0.073282 | -4.9532° at 1.0642um |
| 1.60206 | 1.67755 | -0.075491 | -5.0407° at 0.5321um |
| 1.67190 | 1.76171 | -0.089805 | -5.6926° at 0.2660um |

FIG. 4C

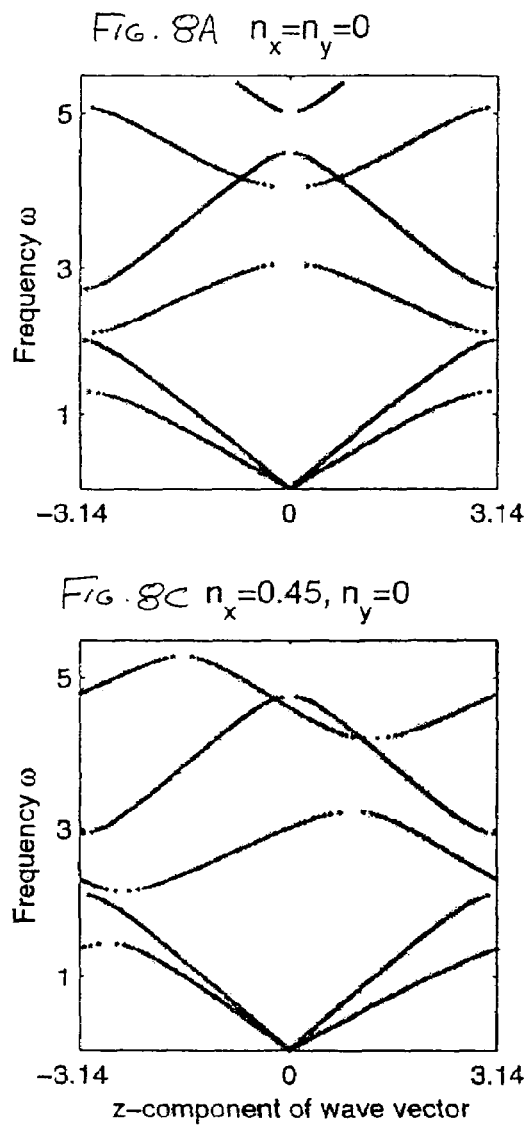
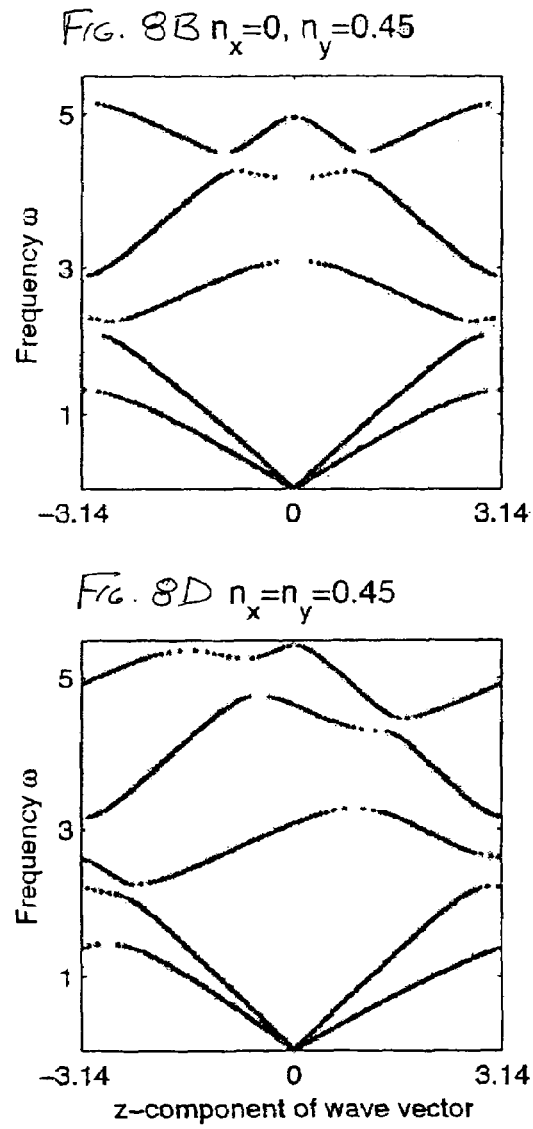
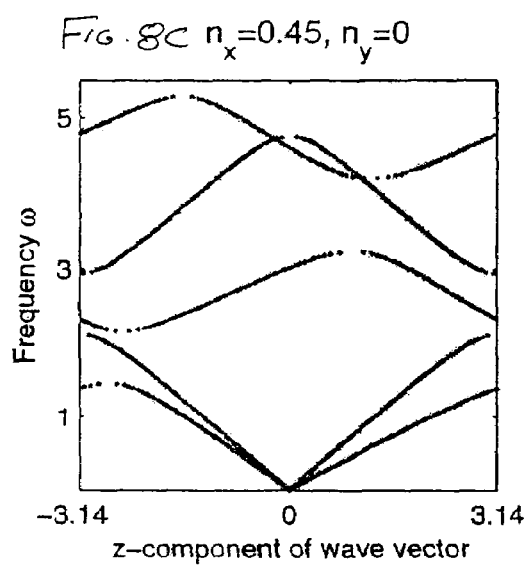
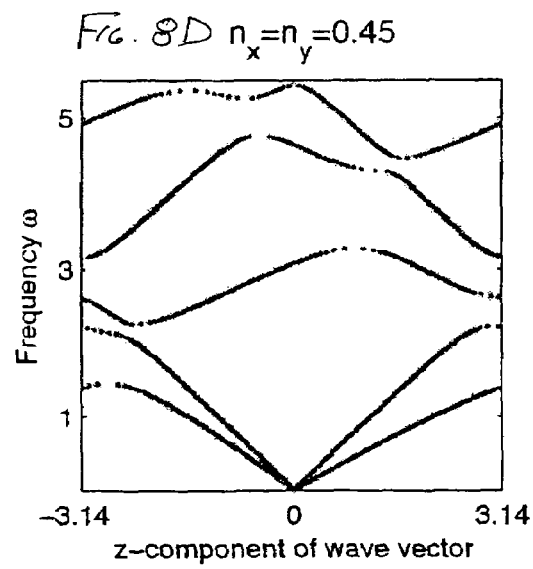

SYSTEMS AND METHODS FOR TRANSMITTING ELECTROMAGNETIC ENERGY IN A PHOTONIC DEVICE

CROSS-REFERENCE TO RELATED APPLICATIONS

This application is based on U.S. provisional application Ser. No. 60/467,492, filed May 1, 2003, which is fully incorporated by reference herein.

This invention was made with Government support under Contract No. F49620-01-1-0567, awarded by Air Force Office of Scientific Research. The Government has certain rights to this invention.

FIELD OF THE INVENTION

The invention relates generally to the field of photonic devices, and more particularly to systems and methods for transmitting an electromagnetic wave in a photonic device.

BACKGROUND INFORMATION

Electromagnetic properties of photonic devices, such as photonic crystals, have been a subject of research for decades. Of particular interest have been periodic stacks of dielectric layers. These stacked devices are typically composed of multiple repeating segments each having two or more dielectric layers with varying refractive indices. The segments are arranged in periodic manner to form a periodic stack. The spatial heterogeneity of these devices can result in qualitatively new electromagnetic properties such as strong dispersion of the group velocity of light propagating through the stack, as well as in the development of frequency gaps in the electromagnetic spectrum. These devices have found numerous applications in microwave and optical technologies.

The effects that occur when a plane electromagnetic wave is incident upon the surface of a typical semi-infinite isotropic periodic stack are well known. First, there is the possibility of omnidirectional reflection when the incident wave is totally reflected by the stack, regardless of the direction of incidence upon the stack. Second, there is the possibility of negative refraction when a tangential component of the energy flux of the transmitted wave is antiparallel to that of the incident wave. Third, there is the dramatic slowdown of the transmitted wave near a photonic band edge frequency when the normal component of the transmitted wave group velocity vanishes along with the respective component of the energy flux. All of the above effects can occur even in the simplest case of a semi-infinite periodic stack, for instance, a stack where each segment is composed of two isotropic layers, such as glass and air.

More recently, research has extended to the phenomena of electromagnetic unidirectionality in non-reciprocal magnetic photonic crystals, for instance, as discussed in A. Figotin et al., U.S. Pat. No. 6,701,048, entitled "Unidirectional Gyrotropic Photonic Crystal and Applications for the Same," which is incorporated by reference herein as if set out in its entirety. A photonic crystal capable of electromagnetic unidirectionality is typically a periodic stack that displays strong bulk spectral asymmetry. An electromagnetic wave traveling with a given frequency in a given direction will be transmitted through the crystal, while a wave of the same frequency propagating in the opposite direction will be frozen, or will at least have a reduced or negligible group velocity. The electromagnetic wave incident on the surface of a unidirectional photonic slab gets trapped inside the magnetic photonic crystal in the form of the frozen mode with greatly reduced group velocity and greatly enhanced amplitude. These stacks are typically composed of multi-layer segments. But here, one of the layers must be made of a magnetic material with low losses and a very strong circular birefringence, or Faraday rotation. Such magnetic materials are readily available for applications at radio and microwave frequencies below 100 Gigahertz (GHz). But at higher frequencies, the magnetic materials displaying the required properties become rare, costly and problematic. In addition, all magnetic materials with sufficiently strong circular birefringence also display a very strong temporal dispersion, which may not be acceptable in a number of applications.

SUMMARY

The present invention is directed to systems and methods that allow for the high efficiency transmission of an incident electromagnetic wave into or through a periodic multilayered photonic device with significantly reduced velocity of wave propagation. In one embodiment, the photonic device includes a body having a front surface and a plurality of periodic segments physically coupled together along a first direction normal to the surface. The device can be receptive to an electromagnetic wave having a first frequency and incident at a direction oblique to the first direction. Each segment can include a first anisotropic dielectric layer having an anisotropic axis at an angle oblique to the first direction, and a second layer. The device can be configured such that the received wave is transmitted within the device in the form of an axially frozen mode with a significantly reduced normal component of the group velocity, significantly increased amplitude, and increased tangential component of electromagnetic energy flux. In another embodiment, the device can be configured such that the received wave is transmitted within the device in the form of a full frozen mode, which is the axially frozen mode further characterized by a significantly reduced group velocity in the tangential direction.

The device can also be configured such that the incident wave is almost completely converted into the frozen electromagnetic mode with little reflection or absorption. The device can be further configured to receive the wave over a desired frequency range, each frequency within the range corresponding to an oblique direction to the first direction. The range of operable frequencies can include the radio, microwave, infrared, optical and ultraviolet spectrums. The geometry of the device and the materials of the constituent components can be configured to achieve the desired operational frequency range. Furthermore, the device can be configured as a stack of layers with one dimensional periodicity, or as a periodic array of the constitutive components with two or three dimensional periodicity. The device can also include a deflection device located adjacent to the front surface of the body and configured to deflect a plurality of spectral components of an incident wave at different angles based on the respective frequencies of the spectral components. The device is also preferably oriented to deflect the plurality of spectral components towards the front surface in different incident directions oblique to the first direction, where each incident direction allows for the respective spectral component to be transmitted through the device in the axially frozen mode.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 4C depicts a non-exhaustive table of various dielectric materials suitable for use in an exemplary embodiment of the anisotropic layer.

FIGS. 8A–D depict plots of the axial dispersion relation of the photonic device of FIG. 1, at various values of $n_x$ and $n_y$ defining the direction of electromagnetic wave incidence.

DETAILED DESCRIPTION

The systems and methods described herein provide for a photonic device capable of transmission of electromagnetic radiation with a greatly reduced group velocity at frequencies up to and including the ultraviolet range. More specifically, the photonic device is capable of electromagnetic transmission in at least two different reduced velocity modes, referred to herein as the axially frozen mode and the full frozen mode. The photonic device is preferably a periodic stack, or periodic layered array, of similar multi-layered segments. The photonic device can also have the geometry of a two or three dimensional photonic crystal. Preferably, at least one layer of each segment of the periodic stack is an anisotropic dielectric layer. In the axially frozen mode regime, a substantial portion of an electromagnetic wave, incident upon the surface of the photonic device, can be transmitted within the device and completely converted into a grazing mode with greatly reduced group velocity in the direction normal to the surface, greatly increased amplitude, and greatly increased tangential component of the energy flux. In the full frozen mode regime, a substantial portion of an electromagnetic wave, incident upon the surface of the photonic device, can be transmitted within the device and completely converted into the axially frozen mode further characterized by a significantly reduced group velocity in the tangential direction.

Figure 1:
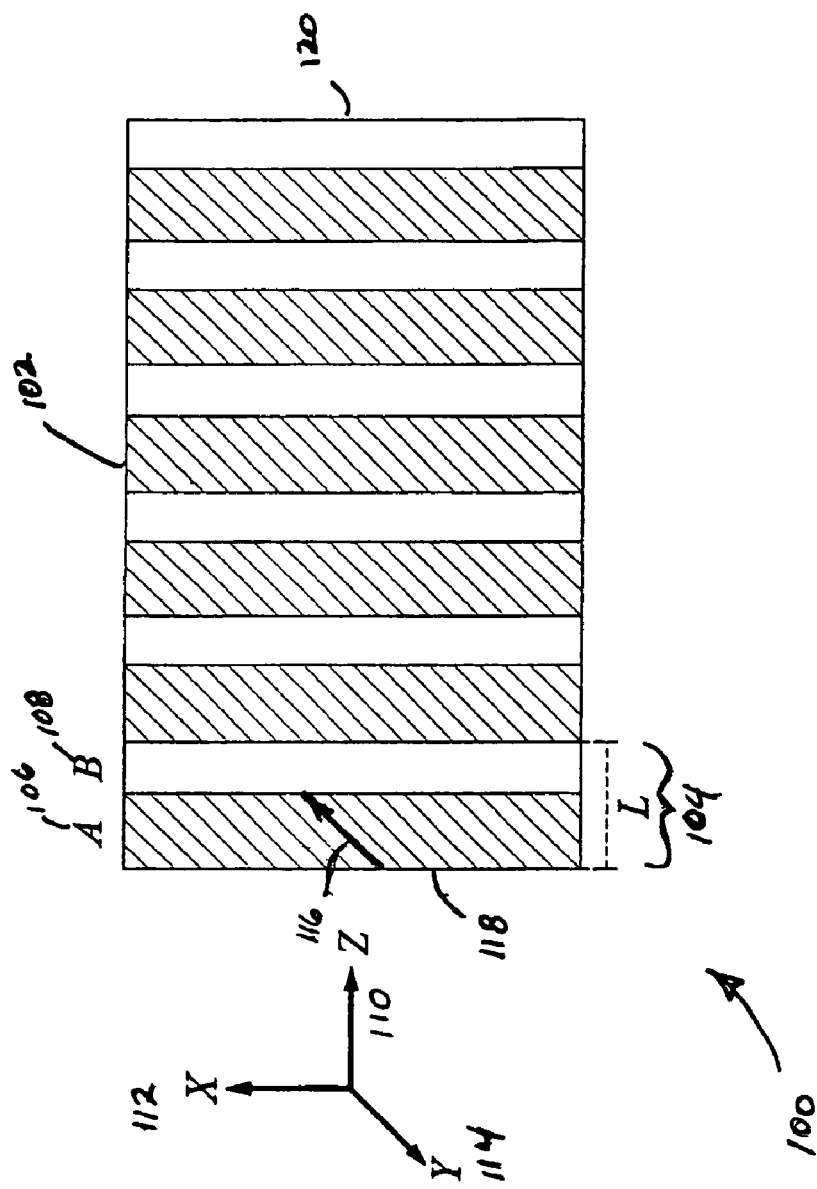
FIG. 1 depicts a schematic view of a one dimensional exemplary embodiment of a photonic device, in which anisotropic dielectric layers with oblique orientation of the anisotropy axis are alternated with isotropic layers.

FIG. 1 depicts a preferred embodiment of photonic device 100, including a photonic body 102. In this embodiment, the body 102 is a periodic stack or slab having multiple segments 104. The segments 104 preferably have planar boundaries physically coupled together and arranged in a periodic stack along the axial dimension 110, which is normal to the surface 118 and, for ease of discussion, corresponds to the Z axis. The tangential directions 112 and 114 correspond to the X and Y axes, respectively. Here, each segment 104 includes two alternating layers 106 and 108. The segment 104 is not necessarily limited to two layers and can include more than two layers depending on the needs of the application. The layer 106 has a moderate to strong dielectric anisotropy with an anisotropic axis 116 oriented at an angle oblique to the axial direction 110.

The layer 108 can be either anisotropic or isotropic according to the needs of the application. However, if both layers 106 and 108 are the anisotropic layers of the device 100, the layer 108 cannot be a mirror image of the layer 106 in order for the photonic device 100 to operate properly. The layer 108 is preferably an active layer in order to provide added functionality to the device 100, while the role of anisotropic layers 106 is preferably reduced to the formation of the frozen mode regimes. For instance, in embodiments implementing non-linear applications, the layer 108 can be composed of a non-linear material.

The anisotropic axis 116 is one of the principle axes of the dielectric permittivity tensor $\epsilon$ of anisotropic layer 106. Preferably, any anisotropic layer 106 within the photonic device 100 includes a non-zero off-diagonal component $\epsilon_{xz}$ and/or $\epsilon_{yz}$ of the dielectric permittivity tensor. This implies an oblique orientation of at least one of the principle axes of the dielectric permittivity tensor $\epsilon$ with respect to the axial direction 110. Below are representations of two exemplary embodiments of the dielectric permittivity tensors for each of the layers 106 and 108. In these examples the layer 108 is preferably isotropic.

$$\varepsilon_{106} = \begin{bmatrix} \varepsilon_{xx} & 0 & \varepsilon_{xz} \\ 0 & \varepsilon_{yy} & 0 \\ \varepsilon_{xz} & 0 & \varepsilon_{zz} \end{bmatrix}, \quad \varepsilon_{108} = \begin{bmatrix} \varepsilon_{108} & 0 & 0 \\ 0 & \varepsilon_{108} & 0 \\ 0 & 0 & \varepsilon_{108} \end{bmatrix} \quad (A)$$

$$\varepsilon_{106} = \begin{bmatrix} \varepsilon_{xx} & \varepsilon_{xy} & \varepsilon_{xz} \\ \varepsilon_{xy} & \varepsilon_{yy} & \varepsilon_{yz} \\ \varepsilon_{xz} & \varepsilon_{yz} & \varepsilon_{zz} \end{bmatrix}, \quad \varepsilon_{108} = \begin{bmatrix} \varepsilon_{108} & 0 & 0 \\ 0 & \varepsilon_{108} & 0 \\ 0 & 0 & \varepsilon_{108} \end{bmatrix} \quad (B)$$

wherein:

∈$_{106}$ is the dielectric permittivity tensor for the layer 106;

∈$_{108}$ is the dielectric permittivity tensor for the layer 108; and

∈$_{xz}$ is the off-diagonal component of the dielectric permittivity tensor for the layer 106.

In (A), only one of the principle axes of the layer 106 lies parallel to the surface 118, in the Y direction. This embodiment is helpful in the conceptual and mathematical illustration of layer 106. In (B), none of the principle axes lie in the X-Y plane.

The period of the body 102 is defined as the distance between adjacent segments 104 in the axial direction 110. Preferably, the dimensions of the body 102 in all three directions are much greater than the period 104. The frequency range is generally determined by the period of the body 102 and the permittivity tensors of the materials of the layers. Specifically, the wavelength in the body 102 is preferably of the same order of magnitude as the period. In addition, the body 102 preferably has a length in the axial direction 110 that is large enough such that any light reflected from the opposite surface 120 has negligible effect on the operation of device 100. Accordingly, the dimensions and period of the body 102 are dependent on the needs of the individual application.

The X-Y, or radial, cross-section can have any shape including circular, square, rectangular and the like. Accordingly, the cross-section of the surface 118 can be configured in a manner conducive with the needs of the particular application. In one embodiment, the surface 118 is circular and gives rise to a cylindrically-shaped body 102. Here, a diameter of 5–10 operational wavelengths and an axial length of 10–50 periods can be sufficient for most applications. The thickness of each of the layers 106 and 108 is preferably comparable with the electromagnetic wavelength in the particular material of the layer, which can be calculated given the desired frequency of operation and the constituent materials used to fabricate the device 100. The exact geometrical values of the body 102, as well as the proper direction of the wave incidence can be determined for given material parameters of the constitutive materials.

As mentioned previously, electromagnetic energy transmitted within the body 102 can be converted into at least two separate frozen mode regimes: the axially frozen mode and the full frozen mode. With regard to each mode, an incident plane wave strikes the surface 118 at a direction that is oblique to the axial direction 110, and the incident wave is partially reflected and partially transmitted into the body 102. In a preferred embodiment, substantially the entire incident wave is transmitted into the body 102 and only a minimal portion of the wave is reflected. In one exemplary embodiment, over 99% of the incident wave is transmitted into the body 102.

The axially frozen mode can be demonstrated by analysis of the electromagnetic dispersion relation of the body 102. The electromagnetic wave within body 102 is characterized by a Bloch wave vector k. The axially frozen mode occurs at a stationary inflection point of the dispersion relation where the first and second partial derivatives of the frequency ω over the Z-component of vector k are zero:

$$u = \frac{\partial \omega}{\partial k} \quad (C)$$

$$u_z = \frac{\partial \omega}{\partial k_z} = 0, \frac{\partial^2 \omega}{\partial k_z^2} = 0, \frac{\partial^3 \omega}{\partial k_z^3} \neq 0 \quad (D)$$

wherein:

u is the group velocity;

u$_z$ is the Z-component of the group velocity; and k$_z$ is the Z-component of the Block wave vector.

At the same time, for the axially frozen mode to occur, the X-component and/or the Y-component of the group velocity are preferably non-zero:

$$u_x = \frac{\partial \omega}{\partial k_x} \neq 0, u_y = \frac{\partial \omega}{\partial k_y} \neq 0, \quad (E)$$

wherein:

u$_x$ is the X-component of the group velocity;

u$_y$ is the Y-component of the group velocity;

k$_x$ is the X-component of the Block wave vector; and k$_y$ is the Y-component of the Block wave vector.

Conversely, in the full frozen mode, the X-component and the Y-component of the group velocity are preferably zero:

$$u_x = \frac{\partial \omega}{\partial k_x} = 0, u_y = \frac{\partial \omega}{\partial k_y} = 0. \quad (F)$$

Figure 2:
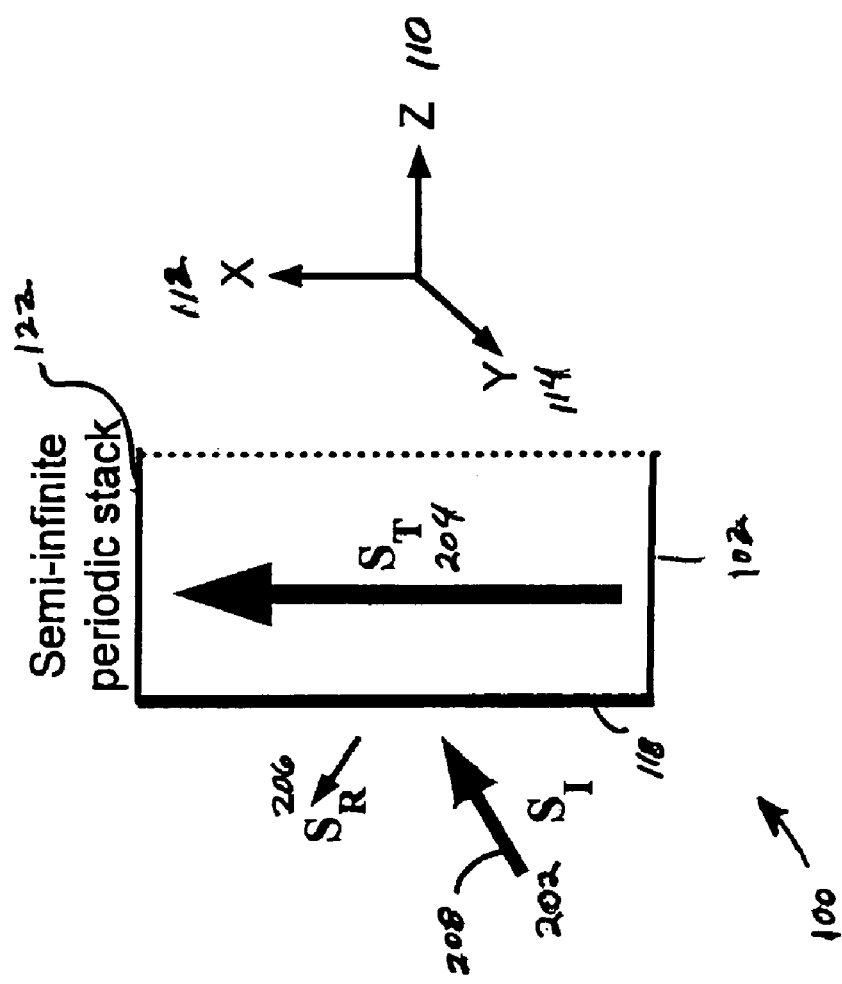
FIG. 2 depicts a schematic view of an exemplary embodiment of the frozen mode regime involving an abnormal grazing mode inside the photonic device.

In the axially frozen mode, the transmitted wave is converted into an abnormal grazing mode (propagating nearly parallel to surface 118) with a substantially tangential group velocity and a significantly increased amplitude. FIG. 2 schematically depicts an exemplary embodiment of the resultant energy fluxes 202–206 occurring in the axially frozen mode. The energy fluxes 202, 204, and 206 correspond to incident, transmitted and reflected waves, respectively. The direction of incidence can be any direction that is oblique to direction 110. Preferably, the reflected energy flux 206 is minimal and the transmitted energy flux 204 is substantially increased in the tangential direction 112. In one exemplary embodiment, the tangential energy flux is increased by three orders of magnitude ($10^3$). In addition, the axial group velocity approaches zero, resulting in the substantially tangential group velocity and providing the basis for the term "axially frozen." Due to the substantial increase in electromagnetic field amplitude and the respective reduction in axial group velocity of the axially frozen mode, the Z component its energy flux can remain close to that of the incident wave.

The full frozen mode is a particular case of the axially frozen mode where all components of the transmitted wave group velocity decreases while the wave amplitude increases correspondingly. More specifically, the tangential components of the group velocity approach zero along with the axial component of the group velocity, and the grazing axial frozen mode turns into the full frozen mode. Similar to the axially frozen mode, the amplitude of the transmitted wave exceeds that of the incident wave. In one exemplary embodiment, the amplitude of the transmitted wave increases by three orders of magnitude. The axially and full frozen modes are discussed further below, and also in A. Figotin and I.

Vitebskiy "Oblique Frozen Modes in Periodic Layered Media," published in Physical Review E 68, 036609 (2003), which is incorporated herein by reference as if set out in its entirety.

Figure 3A:
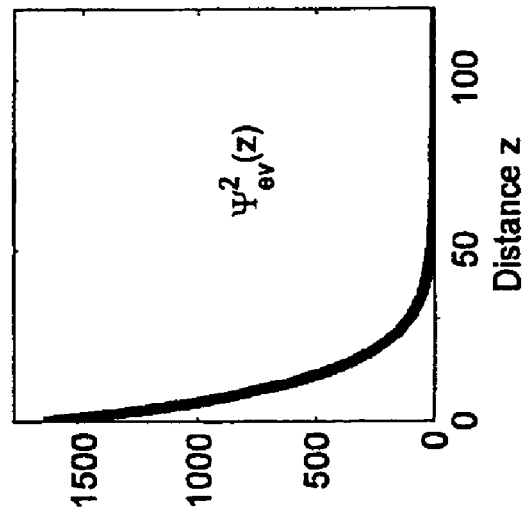
FIG. 3A depicts a plot of the amplitude of the slow light within one exemplary embodiment of the photonic device.

FIG. 3A depicts a graph of the amplitude $\Psi_T^2(z)$ of the resulting electromagnetic field as the incident wave is transmitted within the body 102. Here, the amplitude of the incident wave is unity, and the origin of the Z axis corresponds to the surface 118 and extends along the axial direction 110. In proximity to the full and the axially frozen mode regime, the electromagnetic density is over three orders of magnitude greater than that of the incident wave. This high energy density is offset by the axial group velocity, which is approximately three orders of magnitude less than the speed of light in a vacuum. Accordingly, the axial component of the energy flux is comparable to that of the incident wave and the transmittance approaches unity (see FIG. 4A).

Figure 3B:
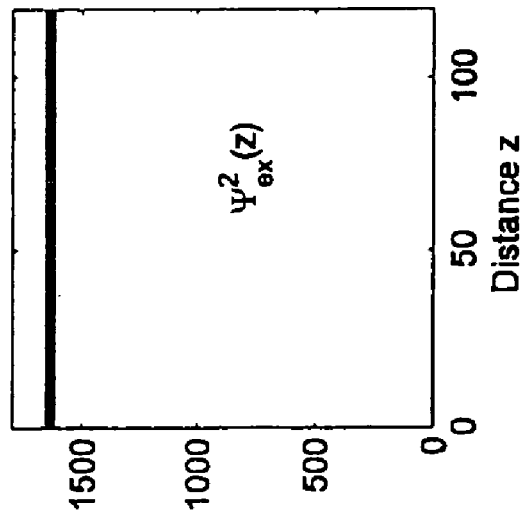
FIG. 3B depicts a plot of the extended component of the electromagnetic field within one exemplary embodiment of the photonic device.
Figure 3C:
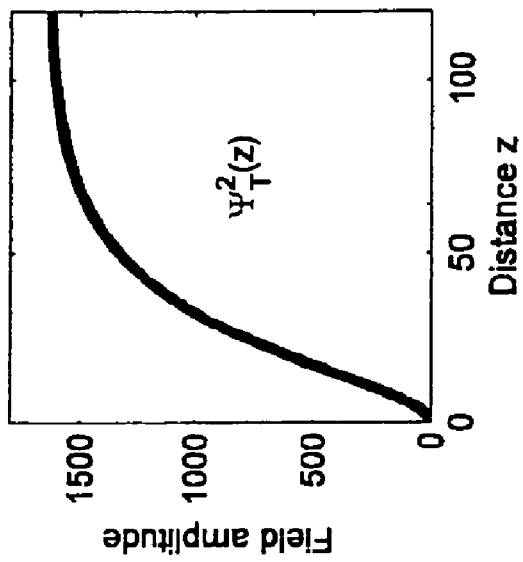
FIG. 3C depicts a plot of the evanescent component of the electromagnetic field within one exemplary embodiment of the photonic device.

FIGS. 3B and 3C depict the amplitude of extended $\Psi_{ex}^2(z)$ and evanescent $\Psi_{ev}^2(z)$ components of the transmitted field in FIG. 3A. The extended component corresponds to a real Bloch wave vector. In this mode, the amplitude of the wave does not depend on space coordinates. The evanescent component corresponds to a complex Bloch vector k. This mode typically exists near the boundaries of the photonic device 100, or in the vicinity of structural imperfections. The evanescent component decays exponentially as the distance from the boundary (or the structural imperfection) increases. Importantly, in the case of full or axially frozen mode, the evanescent mode displays unique behavior which, at least in part, causes the electromagnetic peculiarities of the frozen mode.

Figure 4B:
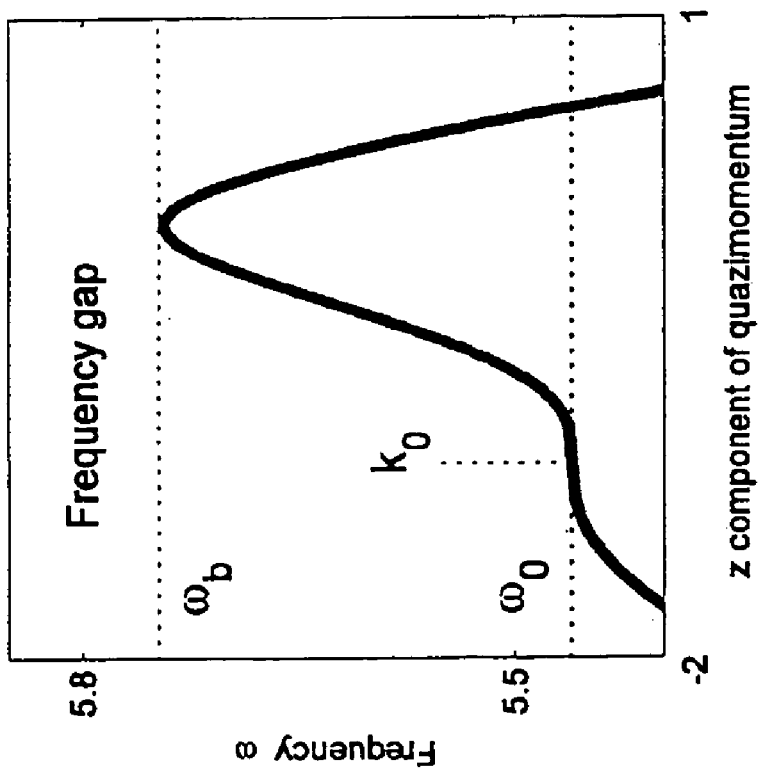
FIG. 4B depicts a plot of the dispersion relation of the electromagnetic wave incident upon the surface of one exemplary embodiment of the photonic device.
Figure 4A:
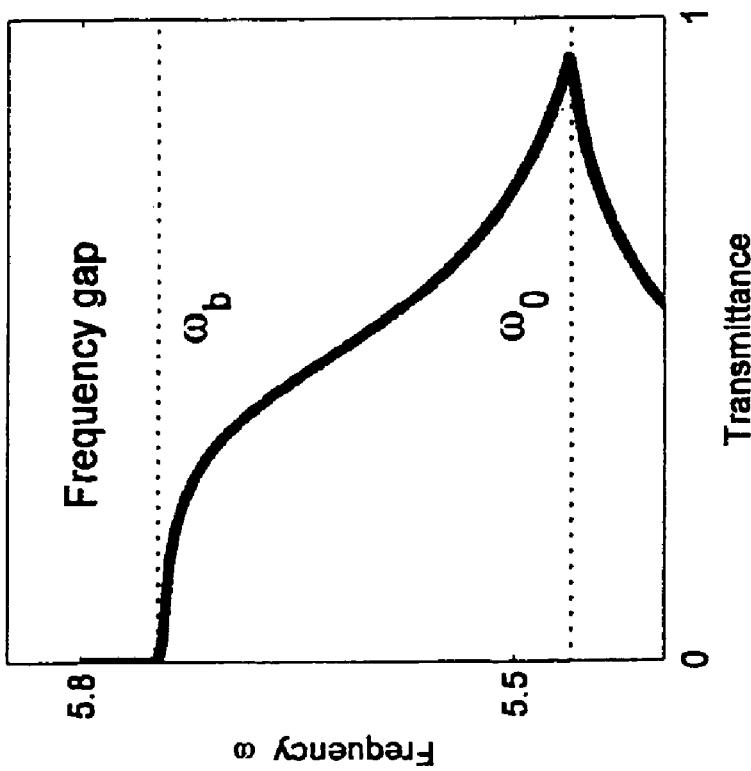
FIG. 4A depicts a plot of the transmittance versus the frequency of an electromagnetic wave incident upon the surface of one exemplary embodiment of the photonic device.

FIG. 4A depicts an example of the transmittance of one embodiment of photonic device 100, demonstrating the dependency between frequency and transmittance at a fixed incident direction 208. Here, the vertical axis is the frequency of the incident wave, while the horizontal axis is the transmittance. As demonstrated in this example, at the frequency $\omega_o$, the transmittance approaches unity and substantially the entire incident wave is transmitted into body 102 and converted into the axially frozen mode. This facilitates the explanation of the large increase in electromagnetic energy density within the body 102. This can be contrasted with the well-known phenomenon of total internal reflection, in the vicinity of which the transmitted wave is also grazing, but its intensity is vanishingly small because the incident wave is almost totally reflected back.

FIG. 4B depicts an example of the dispersion relation $\omega(k_z)$ at a fixed $k_x$ and $k_y$, in this embodiment of device 100. Here, the vertical axis is again the frequency of the incident wave, while the horizontal axis is the z component of the wave vector. At $k_z = k_o$ and $\omega = \omega_o$, the dispersion relation develops the stationary inflection point (D), (E) associated with the axially frozen mode. The frequency $\omega_b$ is the edge of the frequency band for a fixed incident direction 208.

Both the axially frozen mode and the full frozen mode can be achieved at any desired frequency ω within a given frequency range, including the radio (RF), microwave, infrared, optical and ultraviolet spectrums (frequencies up to $3 \times 10^5$ Terahertz). The frequency range is dependent upon the geometry of the body 102, as well as the dielectric materials used. In addition, the phase coherency of a transmitted electromagnetic wave can be preserved in both modes. The existence of phase coherency allows the phase relationship between two electromagnetic waves to be preserved, where one is directed through the device 100 while the other is not.

As mentioned above, the layer 106 is preferably composed of a dielectric material with moderate to high anisotropy of 20–30% or higher. Included in FIG. 4C is a non-exhaustive list of three commercially available example materials that can be used in the fabrication of the layer 106 and any other additional anisotropic layer implemented in the photonic device 100. These materials are suitable for use in the near-infrared and optical frequency ranges, as well as the lower microwave and far-infrared ranges. In the near-infrared and optical frequency ranges, any material with a comparable or stronger magnitude of birefringence could be implemented. For lower frequencies, microwave ceramics can be a more cost effective approach. For those embodiments where the layer 108 is isotropic, one of skill in the art will recognize that the range of materials available to fabricate the layer 108 is very broad.

Preferably, the photonic device 100 is composed of materials that are substantially transparent to the frequency range of interest. Accordingly, the amount of losses are considered to be substantial is dependent on the needs of the individual application. A desired frequency can be achieved within the range by adjusting the direction of incidence 208, which, as stated above, is any direction oblique to the axial direction 110. The axially frozen and full frozen modes can be achieved without the use of magnetic fields or magnetic components and layers, and without the requirement of electromagnetic unidirectionality.

In addition to the one-dimensional configuration, the photonic device 100 can be configured in photonic crystals with two and three dimensional periodicity. Depending upon the application, the one dimensional device 100 can be easier and less costly to produce, and can be fabricated with a degree of precision relatively less than the two and three dimensional devices.

To implement the photonic device 100 in an application at a desired frequency, one of skill in the art preferably solves the Maxwell equations for the periodic stack. The procedure for doing so is detailed extensively below. The frequency of operation can be dependent upon the geometry and composition of the body 102, in addition to the incident direction 208. Accordingly, the geometry and composition will vary according to the desired frequency needs of the application.

In a preferred embodiment, the design and implementation of the body 102 accounts for the field ratio that can be expected in the anticipated applications. For instance, one preferably first determines the ratio of the expected field amplitude occurring in the axially frozen mode and the field amplitude of the incident wave. Then, this ratio can then be used to determine the acceptable margins for geometric fabrication and material homogeneity within the layers 106 and 108. In one exemplary embodiment, the ratio of the expected field amplitudes between the axially frozen wave and the incident wave is 1000. In this case, the deviation of the geometrical and material parameters from their ideal values is preferably less than 0.1%.

A non-exhaustive list of factors that can be considered in the implementation of the photonic device 100 include: 1) configuration such that the axially frozen and/or full frozen modes can occur at the desired frequency or over the desired frequency range; 2) configuration such that the transmittance can be close to unity at the desired frequency or frequency range; 3) configuration such that the field amplitude within the body 102 can reach a maximum, or saturation value at an acceptable distance from the surface 118, considering that the field amplitude increases as the distance from the surface 118 increases, more layers 106 and 108 are generally required; 4) preferably for any nonlinear applications such as higher harmonic generation, wave mixing, amplification (optical, microwave etc.), lasing and the like, configuration such that the field intensity approaches a maximum value in the vicinity of the active layers; and 5) configuration such that the tangential energy flux can occur in the desired direction with the desired magnitude, including a value approaching zero for the full frozen mode.

In addition, it is generally very desirable for the axially and full frozen modes to remain efficient over the desired frequency range $\Delta\omega$. Photonic crystals are heterogeneous materials that inherently display strong spatial dispersion characterized by a complicated dispersion relation $\omega(k)$ with a strong dependence of the wave group velocity on the frequency $\omega$. For photonic devices such as dielectric photonic mirrors or resonant cavities made of high contrast dielectric components, the presence of strong dispersion is not significant. For the majority of other devices, such as photonic delay lines, optical and microwave transmission lines and the like, strong dispersion can be undesirable. This is because strong dispersion can prevent these devices from operating with signals occurring over a broad frequency range, such as short pulses and other signals with diverse spectral components. For instance, in one embodiment, for a given direction of incidence no, the frozen mode regime only occurs at certain frequency $\omega_0$. If the spectral composition of the incident electromagnetic wave is spread over a certain frequency range $\Delta\omega$, then only those wave components with the frequencies close to $\omega_0$ will experience the frozen mode regime. For the rest of the incoming electromagnetic radiation, the overall frozen mode regime can be blurred and weakened due to the strong electromagnetic dispersion of the composite material.

Figure 5:
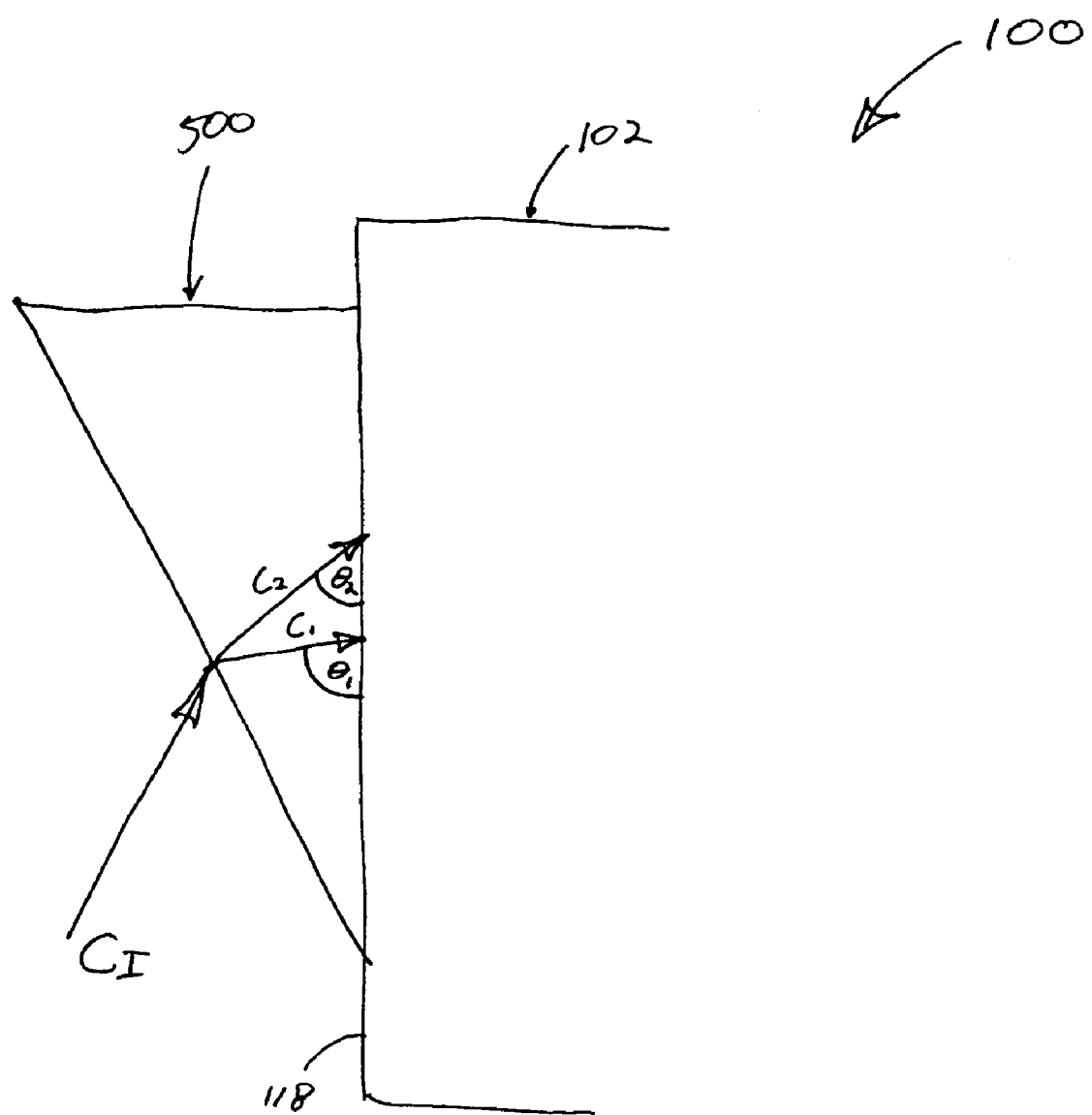
FIG. 5 depicts a schematic view of an exemplary embodiment of a photonic device with a deflection device.

FIG. 5 depicts an exemplary embodiment of the photonic device 100 configured to allow the receipt of a much broader frequency range of electromagnetic radiation. In this embodiment, the photonic body 102 is used in conjunction with a deflection device 500. The deflection device 500 includes any device that deflects the incident light differently depending on the frequency $\omega$. The deflection device 500 is placed between the surface of photonic body 102 and the incoming radiation. Deflection device 500 is preferably oriented such that different spectral components of the incoming radiation are deflected towards the surface of body 102 at the proper direction to allow for the frozen mode regime. In this manner the photonic body 102 becomes receptive to a wider range of frequencies.

For instance, FIG. 5 depicts an embodiment where deflection device 500 is a prism. Here, an electromagnetic wave $A_I$ having two spectral component frequencies $\omega_1$ and $\omega_2$ is incident upon the surface of the prism 500. The prism 500 deflects the incident wave $A_I$ at separate angles based on the component frequencies, resulting in spectral component waves $C_1$ and $C_2$ with frequencies $\omega_1$ and $\omega_2$, respectively. After passing through prism 500, the spectral component waves $C_1$ and $C_2$ enter the interface with the photonic body 102 at different angles $\theta_1$ and $\theta_2$. These angles of incidence $\theta_1$ and $\theta_2$ preferably correspond to the respective incident directions necessary to produce the frozen mode regime for each frequency $\omega_1$ and $\omega_2$. Prism 500 is preferably designed so that for any given frequency within the chosen frequency range $\Delta\omega$, the corresponding spectral component of light is deflected at an angle such that the spectral component is incident upon the surface of body 102 at the proper direction to allow for the frozen mode regime in the photonic body 102. It should be understood that while the incident wave has only two spectral components in this embodiment, deflection device 500 can be configured to properly deflect any number of component waves in the desired frequency range.

The described use of a deflection device 500 allows an increase of the frequency range $\Delta\omega$ for which the axially/full frozen mode regime remains effective by up to three orders of magnitude. This, in turn, allows for much shorter pulses, which occur at multiple frequencies, to be processed by photonic device 100 under frozen mode regime. The physical parameters of deflection device 500 are preferably directly related to the specific geometrical and physical parameters of photonic body 102, as well as the operational frequency of the device. It is important to note that deflection device 500 is not limited to a prism and can be any structure or combination that deflects, refracts, routes or directs an incident electromagnetic wave differently according to the frequency $\omega$. The deflection device 500 can be made, for instance, of a dispersive uniform material, as well as of a composite material. To enhance performance and versatility of the photonic device, some parameters of the deflection device 500, for example, its orientation, can be made adjustable. Furthermore, the deflection device 500 can be used with any photonic device that is at least partially dependent on the relationship between angle of incidence and frequency of incident electromagnetic waves.

The highly flexible and adaptable nature of the systems and methods described herein allows the photonic device 100 to be implemented in numerous applications in various technological fields. In order to further illustrate the numerous features of the photonic device 100, several exemplary embodiments are discussed below. However, it should be noted that these exemplary embodiments are provided for illustrative purposes only. These embodiments do not constitute an exhaustive list of applications and in no way limit the use of the photonic device 100. In addition, unless stated otherwise these embodiments can be implemented with electromagnetic waves operating in any desired frequency range up to and including the ultraviolet spectrum.

In one such exemplary embodiment, the photonic device 100 can be implemented as a tunable delay line with enhanced power capabilities. Here, the tunable delay line can be configured to operate in the full frozen mode where the axial velocity of the electromagnetic wave can be reduced by as much as three orders of magnitude. Preferably, the tunable delay line is configured to achieve a high transmittance at the desired frequencies, allowing a greater portion of the incident wave to be transmitted within the device 100 in turn increasing the operating efficiency. The high power capabilities can result from operation in the full frozen mode, where the bulk electromagnetic wave can achieve the maximum possible density of modes. In addition, the full frozen mode can be achieved on multiple spectral branches of the photonic device 100 and multiple different operating frequencies can be achieved for any given configuration.

In another exemplary embodiment, the photonic device can be implemented as an efficient nonlinear element used for frequency conversion, wave mixing and the like. Preferably, the nonlinear element is configured to operate in either the axially or the full frozen mode with a high transmittance and a high electromagnetic density of states with the device 100.

In yet another exemplary embodiment, the photonic device 100 can be implemented as an optical amplifier. Here, one or both of the layers 106 and 108 serve as an active medium used in amplification. Operation in both the axially and full frozen modes can accumulate photons with the desired frequency and wave vector that, in turn, results in increased amplifier efficiency and reduced dimensions.

In another exemplary embodiment, the device 100 can be used in lasing where the lasing efficiency and can be enhanced while reducing the lasing threshold and the cavity dimensions.

In another exemplary application, the device 100 can be implemented as a host for a multi-dimensional optical network, such as a two or three dimensional integrated optical network and the like. The photonic device 100 can be configured to allow efficient optical transmission, preferably in the axially frozen mode, which is desirable in many optical networking applications.

In a similar exemplary embodiment, the photonic device 100 can be implemented as a incident wave receiver. The device 100 is preferably configured for high transmittance of the incident wave in the axially frozen mode. The incident wave can then be transmitted, with little reflection from the interface 118, within the body 102 to the side surface 122, depicted in FIG. 2. From there the wave can be utilized for the desired purpose such as processing or mixing and the like. In addition, the phase coherency of the transmitted wave is preserved and this feature can be utilized as needed by the individual application. Accordingly, another similar exemplary embodiment exists where the functionality is reversed. In this embodiment, the body 102 can be configured as a directional transmitter and a coherent wave can be radiated into side 122 and transmitted in the desired direction from surface 118.

The following four sections further describe the theoretical basis for the systems and methods provided herein.

Section I: the Axially Frozen Mode

In one exemplary embodiment, photonic device 100 is a semi-infinite periodic stack with the layers 106 being composed of an anisotropic dielectric material with oblique orientation of anisotropic axis 116, as depicted in FIG. 1. Under certain physical conditions, a monochromatic plane wave incident on the semi-infinite slab is converted into an AFM with huge amplitude and nearly tangential energy density flux, as illustrated in FIG. 2.

The group velocity $\vec{u}$ of the axially frozen mode (AFM) is parallel to the boundary of body 102 and, therefore, the magnitude of the tangential component $(\vec{S}_T)_\perp$ of the respective energy density flux $\vec{S}_T$ is overwhelmingly larger than the magnitude of the normal component $(\vec{S}_T)_z$. But, although $(\vec{S}_T)_z \ll (\vec{S}_T)_\perp$, the normal component $(\vec{S}_T)_z$ of the energy density flux inside the slab is still comparable with that of the incident plane wave in vacuum. This property persists even if the normal component $u_z$ of the wave group velocity inside body 102 vanishes, i.e., $$(\vec{S}_T)_z > 0, \text{ if } u_z = 0 \tag{1}$$

The qualitative explanation for this is that the infinitesimally small value of $u_z$ is offset by huge magnitude of the energy density W in the AFM. As the result, the product $u_z W$, which determines the normal component $(\vec{S}_T)_z$ of the energy flux, remains finite. The above behavior is different from what happens in the vicinity of a photonic band edge, where the normal component $u_z$ of the wave group velocity vanishes as well. The transmittance ($\tau$) and the reflectance ($\rho$) of a lossless semi-infinite slab are given as $$\tau = 1 - \rho = \frac{(\vec{S}_T)_z}{(\vec{S}_I)_z}, \rho = -\frac{(\vec{S}_R)_z}{(\vec{S}_I)_z}. \tag{2}$$

In line with Eq. (1), in the AFM regime the transmittance $\tau$ remains significant and can be even close to unity, as shown in the example in FIG. 4A. In other words, the incident plane wave enters body 102 with little reflectance, where it turns into an abnormal AFM with infinitesimally small normal component of the group velocity, huge amplitude, and huge tangential component of the energy density flux. By contrast, in the vicinity of a photonic band edge (at frequencies near $\omega = \omega_b$ in FIG. 4A), the transmittance of body 102 always vanishes, along with the normal component $u_z$ of the wave group velocity.

It turns out that at a given frequency $\omega_0$ the AFM regime can occur only for a special direction $\vec{n}_0$ of the incident plane wave propagation $$\vec{n}_0 = \vec{n}_0(\omega_0) \tag{3}$$

This special direction of incidence always makes an oblique angle with the normal z to the layers. To find $\vec{n}_0$ for a given $\omega_0$ or, conversely, to find $\omega_0$ for a given $\vec{n}_0$, one preferably solves the Maxwell equations in the periodic stratified medium. Now, the relation between the AFM regime and the singularity of the electromagnetic dispersion relation responsible for such a peculiar behavior is considered. If the frequency $\omega$ and the direction of incidence $\vec{n}$ do not match as prescribed by Eq. (3), the AFM regime can be somewhat smeared.

With regard to the vicinity of the AFM, let $\Psi_T(z)$ be the transmitted electromagnetic field inside photonic body 102 (the explicit definition of $\Psi_T(z)$ is given in Eqs. (38) and (88)). It turns out that in the vicinity of the AFM regime, $\Psi_T(z)$ is a superposition of the extended and evanescent Bloch eigenmodes $$\Psi_T(z) = \Psi_{ex}(z) + \Psi_{ev}(z) \; z > 0, \tag{4}$$

where $\Psi_{ex}(z)$ is an extended mode with $u_z > 0$, and $\Psi_{ev}(z)$ is an evanescent mode with Im $k_z > 0$. As shown in an example in FIGS. 3A–C, both the contributions to $\Psi_T(z)$ have huge and nearly equal and opposite values near the boundary of body 102, so that their superposition (4) at $z = 0$ is small enough to satisfy the boundary condition (90). As the distance z from the boundary of body 102 increases, the evanescent component $\Psi_{ev}(z)$ decays exponentially, while the amplitude of the extended component $\Psi_{ex}(z)$ remains constant and huge. As the result, the field amplitude $|\Psi_T(z)|^2$ reaches its huge saturation value $|\Psi_{ex}|^2$ at a certain distance from the boundary of body 102 (see Eqs. (99), (100) and (101)).

When the direction of incidence $\vec{n}$ tends to its critical value $\vec{n}_0$ for a given frequency $\omega_0$, the respective saturation value $|\Psi_{ex}|^2$ of the AFM amplitude $|\Psi_T(z)|^2$ diverges as in $|\vec{n} - \vec{n}_0|^{-2/3}$. Conversely, when the frequency $\omega$ tends to its critical value $\omega_0$ for a given direction of incidence $\vec{n}_0$, the saturation value of the AFM amplitude diverges as $|\omega - \omega_0|^{-2/3}$. In the real situation, of course, the AFM amplitude will be limited by such physical factors as: (i) nonlinear effects, (ii) electromagnetic losses, (iii) structural imperfections of the periodic array, (iv) finiteness of the slab dimensions, (v) deviation of the incident radiation from a perfect plane monochromatic wave.

Figure 6:
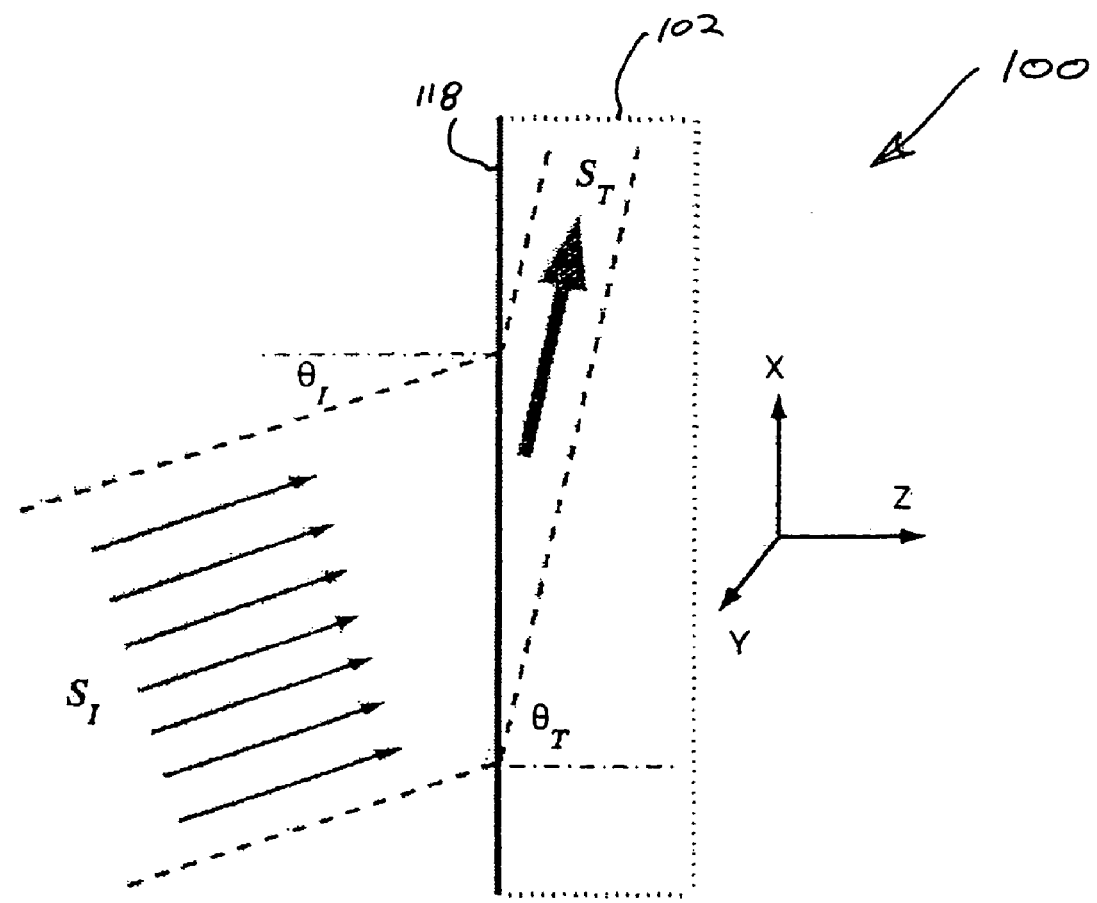
FIG. 6 depicts a schematic view of incident and transmitted waves in the vicinity of the axially frozen mode (AFM) regime in an exemplary embodiment of the photonic device.

FIG. 6 depicts a qualitative example of incident and transmitted (refracted) waves in the vicinity of the AFM regime. The reflected wave is not shown. $\theta_I$ and $\theta_T$ are the incidence and refraction angles, $S_I$ and $S_T$ are the energy density fluxes of the incident and transmitted waves. Both the energy density and the energy density flux in the transmitted wave are much larger than the respective values in the incident wave. However, the total power transmitted by the refracted wave is smaller by factor $\tau$, due to much smaller cross-section area of the nearly grazing transmitted wave.

Consider a wide monochromatic beam of frequency $\omega$ incident on surface 118 of photonic body 102. The direction of incidence $\vec{n}_0 \| \vec{S}_T$, is chosen so that the condition (3) of the AFM regime is satisfied at $\omega=\omega_0$. As frequency $\omega$ tends to $\omega_0$ from either direction, the normal component $u_z$ of the transmitted wave group velocity approaches zero, while the tangential component $\vec{u}_\perp$ remains finite $$u_z \sim |\omega - \omega_0|^{2/3} \to 0, \vec{u}_\perp \to \vec{u}_0 \text{ as } \omega \to \omega_0. \quad (5)$$

This relation together with the equality $$\frac{\pi}{2} - \theta_T = \arctan\frac{u_z}{u_\perp} \quad (6)$$

involving the refraction angle $\theta_T$, yield $$\frac{\pi}{2} - \theta_T \sim |\omega - \omega_0|^{2/3} \to 0 \text{ as } \omega \to \omega_0. \quad (7)$$

Hence, in the vicinity of the AFM regime, the transmitted (refracted) electromagnetic wave can be viewed as a grazing mode. The most important and unique feature of this grazing mode directly relates to the fact that the transmittance $\tau$ of the semi-infinite slab remains finite even at $\omega=\omega_0$ (see, for example, FIG. 4A). Indeed, let $A_I$ and $A_T$ be the cross-section areas of the incident and transmitted (refracted) beams, respectively. Note that, $$\frac{A_T}{A_I} = \frac{\cos\theta_T}{\cos\theta_I} \quad (8)$$

Also note the quantities $$U_I = A_I S_I, \ U_T = A_T S_T, \quad (9)$$

where $S_I$ and $S_T$ are the energy density fluxes of the incident and transmitted waves. $U_I$ and $U_T$ are the total power transmitted by the incident and transmitted (refracted) beams, respectively. Expressions (8) and (9) imply that $$\frac{U_T}{U_I} = \frac{S_T \cos\theta_T}{S_I \cos\theta_I} = \frac{(S_T)_z}{(S_I)_z} = \tau \quad (10)$$

which is nothing more than a manifestation of the energy conservation law. Finally, Eq. (10), together with the formula (7), yield $$S_T = \tau S_I \frac{\cos\theta_I}{\cos\theta_T} \sim |\omega - \omega_0|^{-2/3} \to \infty \text{ as } \omega \to \omega_0. \quad (11)$$

where it has been taken into account that $\tau S_I \cos\theta_I$ is limited (of the order of magnitude of unity) as $\omega \to \omega_0$. By contrast, in the vicinity of the photonic band edge the transmittance $\tau$ of the semi-infinite slab vanishes along with the energy density flux $S_T$ of the transmitted (refracted) wave.

Expressions (7) and (11) show that in the vicinity of the AFM regime, the transmitted wave behaves like a grazing mode with huge and nearly tangential energy density flux $S_T$ and very small (compared to that of the incident beam) cross-section area $A_T$, so that the total power $U_T = A_T S_T$ associated with the transmitted wave cannot exceed the total power $U_I$ of the incident wave: $U_T = \tau_I \leq U_I$.

The above qualitative consideration is corresponds to scales exceeding the size L of the unit cell (which is of the order of magnitude of $c/\omega$) and more importantly, exceeding the transitional distance $l=(\text{Im } k_{ev})^{-1}$ from the boundary of body 102 where the evanescent mode contribution to the resulting electromagnetic field $\Psi_T(z)$ is still significant. The latter means that the width of both the incident and the refracted beams must be much larger than l. If the above condition is not met, the transmitted wave cannot be treated as a beam, and the expressions (7) through (11) do not apply. Instead, one would use the explicit electrodynamic expressions for $\Psi_T(z)$, such as the asymptotic formula (101). Note that if the direction $\vec{n}$ of the incident wave propagation and the frequency $\omega$ exactly match the condition (3) for the AFM regime, the transmitted wave $\Psi_T(z)$ does not reduce to a superposition (4) of canonical Bloch eigenmodes. Instead, the AFM is described by a general Floquet eigenmode $\Psi_{01}(z)$ from Eq. (80), which diverges inside the slab as z, until the nonlinear effects or other limiting factors come into play. The related mathematical analysis is provided in Sections III and IV, below.

Section II: Dispersion Relation with the AFM

Now, the connection between the phenomenon of AFM and the electromagnetic dispersion relation $\omega(\vec{k})$, $\vec{k}=(k_x, k_y, k_z)$ of the periodic stratified medium is discussed. In a plane-parallel stratified slab, the tangential components $(k_x, k_y)$ of the Bloch wave vector $\vec{k}$ always coincide with those of the incident plane wave in FIGS. 1, 3, and 6 while the normal component $k_z$ is different from that of the incident wave. To avoid confusion, in further consideration, the z component of the Bloch wave vector $\vec{k}$ inside the periodic slab will be denoted as k without the subscript z, namely Inside body 102: $\vec{k}=(k_x,k_y,k)$ The value of k is found by solving the Maxwell equations in the periodic stratified medium for given $\omega$ and $(k_x,k_y)$; k is defined up to a multiple of $2\pi/L$, where L is the period of the layers of body 102.

Figure 7A:
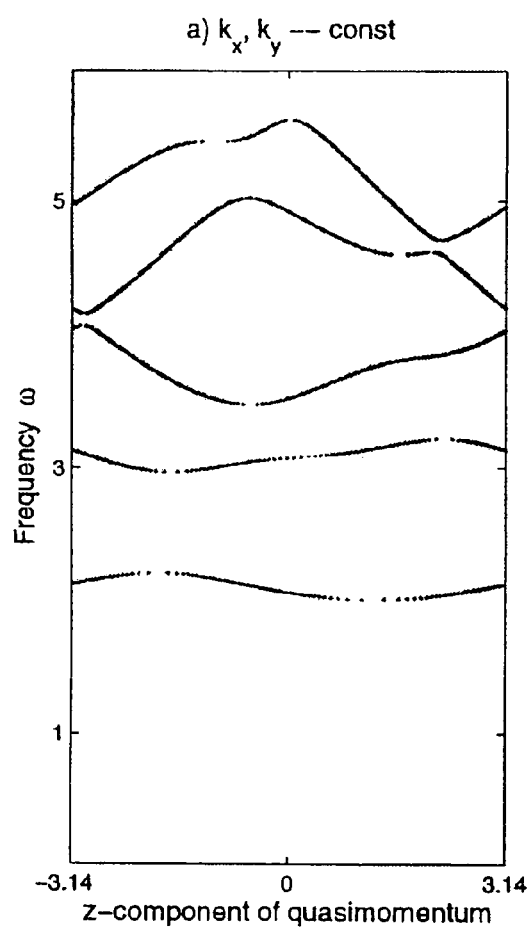
FIG. 7A depicts a plot of the axial dispersion relation of the photonic device of FIG. 1, for fixed values of tangential components $k_x$ and $k_y$ of the wave vector.

Consider now the frequency $\omega$ as function of k for fixed $(k_x,k_y)$. A typical example of such a dependence is shown in FIG. 7A. A large gap at the lowest frequencies is determined by the value of the fixed tangential components $(k_x,k_y)$ of the quasimomentum $\vec{k}$. This gap vanishes in the case of normal incidence, when $k_x=k_y=0$. An alternative and more convenient representation for the dispersion relation is presented in FIG. 7B, where the plot of $\omega(k)$ is obtained for fixed $(n_x,n_y)$ based on $$(n_x,n_y)=(ck_x/\omega, ck_y/\omega) \quad (12)$$

The pair of values $(n_x,n_y)$ coincide with the tangential components of the unit vector $\vec{n}$ defining the direction of the incident plane wave propagation. The dependence $\omega(k)$ for fixed $(n_x,n_y)$ or for fixed $(k_x,k_y)$ will be referred to as the axial dispersion relation.

Suppose that for $\vec{k}=\vec{k}_0$ and $\omega=\omega_0=\omega(\vec{k}_0)$ one of the spectral branches $\omega(k)$ develops a stationary inflection point for given $(k_x,k_y)=(k_{0x}, k_{0y})$, i.e., $$\left(\frac{\partial \omega}{\partial k}\right)_{k_x,k_y}\bigg|_{\vec{k}=\vec{k}_0} = 0; \left(\frac{\partial^2 \omega}{\partial k^2}\right)_{k_x,k_y}\bigg|_{\vec{k}=\vec{k}_0} = 0; \left(\frac{\partial^3 \omega}{\partial k^3}\right)_{k_x,k_y}\bigg|_{\vec{k}=\vec{k}_0} \neq 0, \quad (13)$$

The value $$u_z = \left(\frac{\partial \omega}{\partial k}\right)_{k_x,k_y} \quad (14)$$

in Eq. (13) is the axial component of the group velocity, which vanishes at $\vec{k}=k_0$. Observe that $$u_x = \left(\frac{\partial \omega}{\partial k_x}\right)_{k,k_y} \text{ and } u_y = \left(\frac{\partial \omega}{\partial k_y}\right)_{k,k_x}, \quad (15)$$

representing the tangential components of the group velocity, may not be zeros at $\vec{k}=\vec{k}_0$.

Notice that instead of Eq. (13), one can use another definition of the stationary inflection point $$\left(\frac{\partial \omega}{\partial k}\right)_{n_x,n_y}\bigg|_{\vec{k}=\vec{k}_0} = 0; \left(\frac{\partial^2 \omega}{\partial k^2}\right)_{n_x,n_y}\bigg|_{\vec{k}=\vec{k}_0} = 0; \left(\frac{\partial^3 \omega}{\partial k^3}\right)_{n_x,n_y}\bigg|_{\vec{k}=\vec{k}_0} \neq 0, \quad (16)$$

The partial derivatives in Eq. (16) are taken at constant $(n_x,n_y)$, rather than at constant $(k_x, k_y)$. It should be noted that the definitions (13) and (16) are equivalent.

Figure 7B:
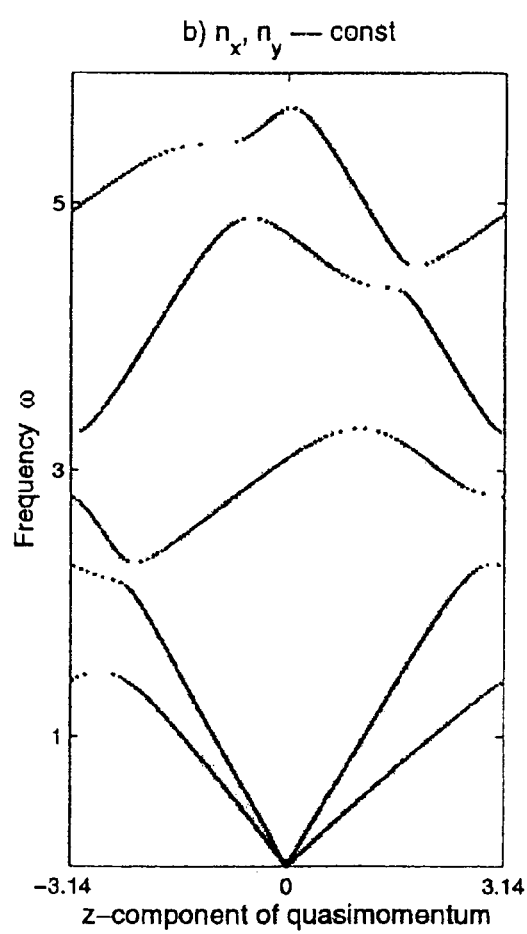
FIG. 7B depicts a plot of the axial dispersion relation of the photonic device of FIG. 1, for fixed values of $n_x$ and $n_y$.

FIG. 4B depicts an enlarged fragment of the upper spectral branch of the axial dispersion relation depicted in FIG. 7B. For the chosen $(n_x,n_y)$, this branch develops a stationary inflection point (16) at $\omega=\omega_0$ and $k=k_0$. The extended Bloch eigenmode with $\omega=\omega_0$ and $\vec{k}=\vec{k}_0$, associated with the stationary inflection point, turns out to be directly related to the axially frozen mode (AFM).

In Sections III and IV, based on the Maxwell equations, it is shown that the singularity (16) (or, equivalently, Eq. (13)) leads to the very distinct AFM regime in the semi-infinite periodic stack. Also shown is that a necessary condition for such a singularity and a necessary condition for the AFM existence is the following property of the axial dispersion relation of the periodic stack:

$$\omega(k_x,k_y,k) \neq \omega(k_x,k_y,-k) \text{ or, equivalently, } \omega(n_x,n_y,k) \neq \omega(n_x,n_y,-k) \quad (17)$$

This property will be referred to as the axial spectral asymmetry. Evidently, the axial dispersion relations presented in FIG. 7, satisfy this criterion.

Referring now to the conditions for the axial spectral symmetry, it should be noted that a periodic array would definitely have an axially symmetric dispersion relation $$\omega(k_x,k_y,k)=\omega(k_x,k_y,-k) \text{ or, equivalently, } \omega(n_x,n_y,k)=\omega(n_x,n_y,-k) \quad (18)$$

if the symmetry group G of the periodic stratified medium includes any of the following two symmetry operations:

$$m_z, 2'_z=2_z\times R, \quad (19)$$

where $m_z$ is the mirror plane parallel to the layers, $2_z$ is the 2-fold rotation about the z axis, and R is the time reversal operation. Indeed, since $2_z(k_x,k_y,k)=(-k_x,-k_y,k)$ and $R(k_x,k_y,k)=(-k_x,-k_y,-k)$, one has $$2'_z(k_x,k_y,k)=(k_x,k_y,-k),$$

which implies the relation (18) for arbitrary $(k_x,k_y)$. The same is true for the mirror plane $m_z$ $$m_z(k_x,k_y,k)=(k_x,k_y,-k)$$

Consequently, a necessary condition for the axial spectral asymmetry (17) of a body 102 is the absence of the symmetry operations (19), i.e., $$m_z \notin G \text{ and } 2'_z \notin G. \quad (20)$$

In reciprocal (nonmagnetic) media, where by definition, $R \in G$, instead of Eq. (20) one can use the following requirement $$m_z \notin G \text{ and } 2_z \notin G. \quad (21),$$

Note, that the axial spectral symmetry (18) is different from the bulk spectral symmetry $$\omega(k_x,k_y,k)=\omega(-k_x,-k_y,-k) \quad (22)$$

For example, the space inversion I and/or the time reversal R, if present in G, ensure the bulk spectral symmetry (22), but neither I nor R ensures the axial spectral symmetry (18). Condition (21) for the axial spectral asymmetry imposes certain restrictions on the geometry and composition of body 102, as well as on the direction of the incident wave propagation. It should be noted that an exemplary embodiment of body 102, where body 102 is made up of isotropic dielectric components with different refractive indices, always has axially symmetric dispersion relation (18), no matter how complicated the periodic array is or how many different isotropic materials are involved. To prove this, it suffices to note that such a stack always supports the symmetry operation $2_z$.

The symmetry operation $2_z$ holds in the more general case when all the layers are either isotropic, or have a purely in-plane anisotropy $$\hat{\varepsilon} = \begin{bmatrix} \varepsilon_{xx} & \varepsilon_{xy} & 0 \\ \varepsilon_{xy} & \varepsilon_{yy} & 0 \\ 0 & 0 & \varepsilon_{zz} \end{bmatrix} \quad (23)$$

The in-plane anisotropy (23) does not remove the symmetry operation $2_z$ and, therefore, the property (18) of the axial spectral symmetry holds in this case. Thus, it can be stated that in order to display the axial spectral asymmetry, body 102 preferably includes at least one anisotropic component, either uniaxial or biaxial. In addition, one of the principle axes of the respective dielectric permittivity tensor $\hat{\varepsilon}$ must make an oblique angle with the normal to the layers, which means that at least one of the two components $\varepsilon_{xz}$ and $\varepsilon_{yz}$ of the respective dielectric tensor must be nonzero.

The above requirement provides a useful idea on the kind of periodic stratified media that can support the axial spectral asymmetry and the AFM regime. But this is not a substitute for the stronger symmetry criterion (20) or (21). As stated above, if both layers 106 and 108 are the anisotropic layers of device 100, the layer 108 cannot be a mirror image of the layer 106 because body 102 would have the mirror plane $m_z$, which, according to the expression (19), ensures the axial spectral symmetry.

Referring now to a restriction of the direction of the incident wave propagation, consider an important particular case $k_x = k_y = 0$ of the normal incidence. The criterion (17) reduces now to the simple requirement $$\omega(\vec{k}) \neq \omega(-\vec{k}), \text{ where } \vec{k} = (0,0,k) \quad (24)$$

of the bulk spectral asymmetry, which is prohibited in nonmagnetic photonic crystals due to the time reversal symmetry. Therefore, in the nonmagnetic case, one has the following additional condition for the axial spectral asymmetry is provided $$k_\perp = \sqrt{k_x^2 + k_y^2} \neq 0, \quad (25)$$

implying that the AFM cannot be excited in a nonmagnetic semi-infinite stack by a normally incident plane wave, i.e., the incident angle must be oblique.

Conditions (21) and (25) may not be necessary in the case of nonreciprocal magnetic stacks (this is discussed further in A. Figotin, and I. Vitebskiy. *Nonreciprocal magnetic photonic crystals*. Phys. Rev. E63, 066609 (2001), which is incorporated by reference herein as if set out in its entirety). But as mentioned earlier, at frequencies above $10^{12}$ Hz, the nonreciprocal effects in common nonconducting materials are negligible. Therefore, in order to have a robust AFM regime in the infrared or optical frequency range, both requirements (21) and (25) are preferably satisfied, regardless of whether or not nonreciprocal magnetic materials are involved.

As the above conditions are met, the AFM regime can be achieved at any desirable frequency $\omega$ within a certain frequency range $\Delta\omega$. The frequency range $\Delta\omega$ is determined by the stack geometry and the dielectric materials used, while a specific value of $\omega$ within the range can be selected by the direction $\vec{n}$ of the light incidence.

Body 102 of FIG. 1 is made up of anisotropic layers 106 alternated with isotropic layers 108. The respective dielectric permittivity tensors are $$\hat{\varepsilon}_{106} = \begin{bmatrix} \varepsilon_{xx} & 0 & \varepsilon_{xz} \\ 0 & \varepsilon_{yy} & 0 \\ \varepsilon_{xz} & 0 & \varepsilon_{zz} \end{bmatrix}, \hat{\varepsilon}_{108} = \begin{bmatrix} \varepsilon_B & 0 & 0 \\ 0 & \varepsilon_B & 0 \\ 0 & 0 & \varepsilon_B \end{bmatrix}. \quad (26)$$

For purposes of illustration, it is assumed $$\hat{u}_{106} = \hat{u}_{108} = \hat{i} \quad (27)$$

Body 102 in FIG. 1 has the monoclinic symmetry $$2_y/m_y \quad (28)$$

with the mirror plane $m_y$ normal to the y-axis. Such a symmetry is compatible with the necessary condition (21) for the AFM existence. Symmetry (28) does impose additional constraints on the direction $\vec{n}$ of the incident wave propagation.

In FIG. 8 the axial dispersion relation $\omega(k)$ of photonic body 102 of FIG. 1 is computed for four different directions $(n_x, n_y)$ of incident wave propagation. These four cases cover all the possibilities, different in terms of symmetry.

In the case (a) of normal incidence, when $n_x = n_y = 0$, the dispersion relation is axially symmetric, as must be the case with any reciprocal periodic stratified medium (see the explanation after Eq. (24)).

In the case (b), when $n_x = 0$ and $n_y \neq 0$, the two necessary conditions (21) and (25) for the axial spectral asymmetry are met. Yet, those conditions prove not to be sufficient. Indeed, if $n_x = 0$, either of the symmetry operations $$2_y \text{ and } m_y' = m_y \times R \quad (29)$$

imposes the relation $$\omega(0, k_y, k) = \omega(0, k_y, -k) \quad (30)$$

which implies the axial spectral symmetry. Neither stationary inflection point, nor AFM can occur in this case.

In the case (c), when $n_x \neq 0$ and $n_y = 0$, the situation is more complicated. The quasimomentum $\vec{k}$ lies now in the x-z plane, which coincides with the mirror plane $m_y$. Therefore, every Bloch eigenmode $\Psi_{\vec{k}}(z)$ can be classified as a pure TE or pure TM mode, depending on the $\Psi_{\vec{k}}(z)$ parity with respect to the mirror reflection $m_y$ for TE mode $m_y \Psi_{\vec{k}}(z) = -\Psi_{\vec{k}}(z)$; for TM mode: $m_y \Psi_{\vec{k}}(z) = \Psi_{\vec{k}}(z)$. (31)

The TE modes have axially symmetric dispersion relation for TE modes: $\omega(k_x, 0, k) = \omega(k_x, 0, -k)$. (32)

Indeed, the component $\varepsilon_{xz}$ of the dielectric tensor $\hat{\varepsilon}_A$ does not affect the TE modes, because in this case the electric component $E(r,t)$ of the electromagnetic field is parallel to the y axis. As a consequence, the axial dispersion relation of the TE spectral branches is similar to that of the isotropic case with $\varepsilon_{xz} 0$, where it is always symmetric. By contrast, for the TM modes one has $E(r,t) \perp y$. Therefore, the TM modes are affected by $\epsilon_{xz}$ and display axially asymmetric dispersion relation $$\text{for TM modes: } \omega(k_x,0,k) \neq \omega(k_x,0,-k), \quad (33)$$

as seen in FIG. 8C. It should be noted that the equality (32) cannot be derived from symmetry arguments only. The axial spectral symmetry of the TE modes is not exact and relies on the approximation (27) for the magnetic permeability of the A layers. On the other hand, the fact that the spectral branches have different parity (31) with respect to the symmetry operation $m_y$, implies that none of the branches can develop a stationary inflection point (see Eq. (83) and explanations thereafter). Thus, in the case $n_y=0$, in spite of the axial spectral asymmetry, the AFM regime cannot occur either.

Finally, in the general case (d), when $n_x \neq 0$ and $n_y \neq 0$, all the spectral branches display the property (17) of the axial spectral asymmetry. In addition, the Bloch eigenmodes now are of the same symmetry, neither TE, nor TM. This is the case when the AFM regime can be achieved at some frequencies by proper choice of the incident angle. For instance, if the equality $n_x=n_y$ is imposed and only the incident angle is changed, it turns out that every single spectral branch at some point can develop a stationary inflection point (16) and display the AFM at the respective frequency. In order to achieve the AFM at a specified frequency $\omega_0$, both $n_x$ and $n_y$ are preferably adjusted.

Section III: Electrodynamics of the Axially Frozen Mode

First, the classical Maxwell equations for time-harmonic fields in nonconducting media are noted $$\nabla \times E(\vec{r}) = i\frac{\omega}{c}B(\vec{r}), \nabla \times H(\vec{r}) = i\frac{\omega}{c}D(\vec{r}), \quad (34)$$

where $$D(\vec{r}) = \hat{\epsilon}(\vec{r})E(\vec{r}), B(\vec{r}) = \hat{\mu}(\vec{r})H(\vec{r}). \quad (35)$$

In a lossless dielectric medium, the material tensors $\hat{\epsilon}(\vec{r})$ and $\hat{\mu}(\vec{r})$ are Hermitian. In a stratified medium, the tensors $\hat{\epsilon}(\vec{r})$ and $\hat{\mu}(\vec{r})$ depend on a single Cartesian coordinate z, and the Maxwell equations (34) can be recast as $$\nabla \times E(\vec{r}) = i\frac{\omega}{c}\hat{\mu}(z)H(\vec{r}), \nabla \times H(\vec{r}) = i\frac{\omega}{c}\hat{\epsilon}(z)E(\vec{r}). \quad (36)$$

Solutions for Eq. (36) are sought in the following form $$E(\vec{r}) = e^{i(k_x x + k_y y)}\vec{E}(z), H(\vec{r}) = e^{i(k_x x + k_y y)}\vec{H}(z) \quad (37)$$

The substitution (37) transforms the system of six linear equation (36) into a system of four linear differential equations $$\partial_z \Psi(z) = i\frac{\omega}{c}M(z)\Psi(z), \Psi(z) = \begin{bmatrix} E_x(z) \\ E_y(z) \\ H_x(z) \\ H_y(z) \end{bmatrix}. \quad (38)$$

The explicit expression for the Maxwell operator M(z) is $$M(z) = \begin{bmatrix} M_{11} & M_{12} \\ M_{21} & M_{22} \end{bmatrix} \quad (39)$$

where $$M_{11} = \begin{bmatrix} -\frac{\epsilon_{xz}^*}{\epsilon_{zz}}n_x - \frac{\mu_{yz}}{\mu_{zz}}n_y & \left(-\frac{\epsilon_{yz}^*}{\epsilon_{zz}} + \frac{\mu_{yz}}{\mu_{zz}}\right)n_x \\ -\left(\frac{\epsilon_{xz}^*}{\epsilon_{zz}} - \frac{\mu_{xz}}{\mu_{zz}}\right)n_y & -\frac{\epsilon_{yz}^*}{\epsilon_{zz}}n_y - \frac{\mu_{xz}}{\mu_{zz}}n_x \end{bmatrix},$$

$$M_{22} = \begin{bmatrix} -\frac{\epsilon_{yz}}{\epsilon_{zz}}n_y - \frac{\mu_{xz}^*}{\mu_{zz}}n_x & \left(\frac{\epsilon_{yz}}{\epsilon_{zz}} - \frac{\mu_{yz}^*}{\mu_{zz}}\right)n_x \\ \left(\frac{\epsilon_{xz}}{\epsilon_{zz}} - \frac{\mu_{xz}^*}{\mu_{zz}}\right)n_y & -\frac{\epsilon_{xz}}{\epsilon_{zz}}n_x - \frac{\mu_{yz}^*}{\mu_{zz}}n_y \end{bmatrix},$$

$$M_{12} = \begin{bmatrix} \mu_{xy}^* - \frac{\mu_{xz}^*\mu_{yz}}{\mu_{zz}} + \frac{n_x n_y}{\epsilon_{zz}} & \mu_{yy} - \frac{\mu_{yz}\mu_{yz}^*}{\mu_{zz}} - \frac{n_x^2}{\epsilon_{zz}} \\ -\mu_{xx} + \frac{\mu_{xz}\mu_{xz}^*}{\mu_{zz}} + \frac{n_y^2}{\epsilon_{zz}} & -\mu_{xy} + \frac{\mu_{xz}\mu_{yz}^*}{\mu_{zz}} - \frac{n_x n_y}{\epsilon_{zz}} \end{bmatrix},$$

$$M_{21} = \begin{bmatrix} -\epsilon_{xy}^* + \frac{\epsilon_{xz}^*\epsilon_{yz}}{\epsilon_{zz}} - \frac{n_x n_y}{\mu_{zz}} & -\epsilon_{yy} + \frac{\epsilon_{yz}\epsilon_{yz}^*}{\epsilon_{zz}} + \frac{n_x^2}{\mu_{zz}} \\ \epsilon_{xx} - \frac{\epsilon_{xz}\epsilon_{xz}^*}{\epsilon_{zz}} - \frac{n_y^2}{\mu_{zz}} & \epsilon_{xy} - \frac{\epsilon_{xz}\epsilon_{yz}^*}{\epsilon_{zz}} + \frac{n_x n_y}{\mu_{zz}} \end{bmatrix}.$$

The Cartesian components of the material tensors $\hat{\epsilon}$ and $\hat{\mu}$ are functions of z and (in dispersive media) $\Omega$. The reduced Maxwell equation (38) should be complemented with the following expressions for the z components of the fields $$E_z = (-n_x H_y + n_y H_x - \epsilon_{13}^* E_x - \epsilon_{23}^* E_y)\epsilon_{zz}^{-1}$$

$$H_z = (n_x E_y - n_y E_x - \mu_{13}^* H_x - \mu_{23}^* H_y)\mu_{zz}^{-1}$$

where $(n_x, n_y)$ are defined in Eq. (12).

Notice that in the case of normal incidence, the Maxwell operator is drastically simplified $$M_{11} = M_{22} = 0, \text{ for } n_x = n_y = 0. \quad (41)$$

This is similar to the case of electromagnetic unidirectionality in nonreciprocal magnetic photonic crystals. By contrast, this Section shows how the terms $M_{11}$ and $M_{22}$, occurring only in the case of oblique incidence, can lead to the phenomenon of AFM, regardless of whether or not the nonreciprocal effects are present. Importantly, the 4×4 matrix M(z) in Eq. (39) has the property of J-Hermitivity defined as $$(JM)^{\dagger} = JM \quad (42)$$

where $$J = J^{-1} = \begin{bmatrix} 0 & 0 & 0 & 1 \\ 0 & 0 & -1 & 0 \\ 0 & -1 & 0 & 0 \\ 1 & 0 & 0 & 0 \end{bmatrix} \quad (43)$$

Different versions of the reduced Maxwell equation (38) can be found in the extensive literature on electrodynamics of stratified media (see, for example, D. W. Berreman. J. Opt. Soc. Am. A62, 502–10 (1972); I. Abdulhalim. Analytic propagation matrix method for anisotropic magneto-optic layered media, J. Opt. A: Pure Appl. Opt. 2, 557 (2000); I. Abdulhalim. Analytic propagation matrix method for linear optics of arbitrary biaxial layered media, J. Opt. A: Pure Appl. Opt. 1, 646 (1999) and references therein, all of which are incorporated by reference herein as if set out in their entirety). For more detailed studies of J-Hermitian and J-unitary operators see M. G. Krein and V. A. Jacubovich. "Four Papers on Ordinary Differential Equations", American Mathematical Society Translations, Series 2, Vol. 120, 1983, pp. 1–70, which is incorporated by reference herein as if set out in its entirety.

The Cauchy Problem $$\partial_z \Psi(z) = i\frac{\omega}{c} M(z)\Psi(z), \Psi(z_0) = \Psi_0 \quad (44)$$

for the reduced Maxwell equation (38) has a unique solution $$\Psi(z)=\Psi(z,z_0)\Psi(z_0) \quad (45)$$

where the 4×4 matrix $T(z, z_0)$ is so-called transfer matrix. From the definition (45) of the transfer matrix it follows that $$T(z,z_0)=T(z,z')T(z',z_0), T(z,z_0)=T^{-1}(z_0,z), T(z,z)=I. \quad (46)$$

The matrix $T(z,z_0)$ is uniquely defined by the following Cauchy problem $$\partial_z T(z, z_0) = i\frac{\omega}{c} M(z)T(z, z_0), T(z, z) = I. \quad (47)$$

The equation (47), together with J-Hermitivity (42) of the Maxwell operator M(z), imply that the matrix $T(z,z_0)$ is J-unitarity, i.e., $$T^\dagger(z,z_0)=JT^{-1}(z,z_0), \quad (48)$$

(see the proof in A. Figotin and I. Vitebskiy "Oblique Frozen Modes in Periodic Layered Media," published in Physical Review E 68, 036609 (2003)). The J-unitarity (48) of the transfer matrix imposes strong constraints on its eigenvalues [see Eq. (61)]. It also implies that $$|det\ T(z,z_0)|=1. \quad (49)$$

The transfer matrix $T_S$ of a stack of layers is a sequential product of the transfer matrices $T_m$ of the constitutive layers $$T_S = \prod_m T_m \quad (50)$$

If the individual layers are homogeneous, the corresponding single-layer transfer matrices $T_m$ are explicitly expressed in terms of the respective Maxwell operators $M_m$ $$T_m=\exp(iz_m M_m) \quad (51)$$

where $z_m$ is the thickness of the m-th layer. The explicit expression for $M_m$ is given by Eq. (39). Thus, formula (50), together with Eqs. (51) and (39), gives an explicit expression for the transfer matrix $T_S$ of an arbitrary stack of anisotropic dielectric layers. $T_S$ is a function of (i) the material tensors $\hat\epsilon$ and $\hat\mu$ in each layer of the stack, (ii) the layer thicknesses, (iii) the frequency $\omega$, and (iv) the tangential components $(k_x,k_y)=(n_x\omega/c,n_y\omega/c)$ of the wave vector.

Consider the important particular case of normal wave propagation. Using Eq. (51) and the explicit expression (39) for the Maxwell operator, one can prove that $$det(T_S)=1, \text{ for } n_x=n_y=0. \quad (52)$$

In body 102, all material tensors, along with the J-Hermitian matrix M(z) in Eq. (38), are periodic functions of z $$M(z+L)=M(z) \quad (53)$$

where L is the length of a primitive cell of the periodic stack. By definition, Bloch solutions $\Psi_k(z)$ of the reduced Maxwell equation (38) with the periodic operator M(z) satisfy $$\Psi_k(z+L)=e^{ikL}\Psi_k(z). \quad (54)$$

Definition (45) of the T-matrix together with Eq. (54) give $$\Psi_k(z+L)=T(z+L,z)\Psi_k(z)=e^{ikL}\Psi_k(z). \quad (55)$$

Introducing the transfer matrix of a primitive cell $$T_L=T(L,0) \quad (56)$$

one has from Eq. (55)

$$T_L \Phi_k = e^{ikL}\Phi_k, \text{ where } \Phi_k=\Psi_k(0) \quad (57)$$

where $\Phi_k=\Psi_k(0)$. Thus, the eigenvectors of the transfer matrix $T_L$ of the unit cell are uniquely related to the eigenmodes of the reduced Maxwell equation (38) through the relations $$\Phi_{k_1}=\Psi_{k_1}(0), \Phi_{k_2}=\psi_{k_2}(0), \Phi_{k_3}=\Psi_{k_3}(0), \Phi_{k_4}=\Psi_{k_4}(0). \quad (58)$$

The respective four eigenvalues $$X_i=e^{ik_iL}, i=1,2,3,4 \quad (59)$$

of $T_L$ are the roots of the characteristic equation $$F(X)=0, \quad (60)$$

where $F(X)=det(T_L-X\hat I)=X^4+P_3X^3+P_2X^2+P_1X+1$. For any given $\omega$ and $(k_x,k_y)$, the characteristic equation defines a set of four values $\{X_1, X_2, X_3, X_4\}$, or equivalently, $\{k_1, k_2, k_3, k_4\}$. Real k correspond to propagating Bloch waves (extended modes), while complex k correspond to evanescent modes. Evanescent modes are relevant near photonic crystal boundaries and other structural irregularities.

The J-unitarity (48) of $T_L$ imposes the following restriction on the eigenvalues (59) for any given $\omega$ and $(k_x,k_y)$ $$\{k_i\}\equiv\{k_i^*\}, i=1,2,3,4. \quad (61)$$

In view of the relation (61), one has to consider three different situation. The first possibility $$k_1\equiv k_1^*, k_2\equiv k_2^*, k_3\equiv k_3^*, k_4\equiv k_4^*, \quad (62)$$

relates to the case of all four Bloch eigenmodes being extended. The second possibility $$k_1\equiv k_1^*, k_2\equiv k_2^*, k_3\equiv k_4^*, \quad (63)$$

where $k_3 \ne k_3^*$, $k_4 \ne k_4^*$, relates to the case of two extended and two evanescent modes. The last possibility $$k_1\equiv k_2^*, k_3\equiv k_4^*, \quad (64)$$

where $k_1 \ne k_1^*$, $k_2 \ne k_2^*$, $k_3^*$, $k_4 \ne k_4^*$ relates the case of a frequency gap, when all four Bloch eigenmodes are evanescent.

Observe that the relation $$k_1+k_2+k_3+k_4=0$$

valid in the case of normal incidence, may not apply now.

Assume that the transfer matrix $T_L$ s similar to its inverse $$T_L=U^{-1}T_L^{-1}U \qquad (65)$$

where V=JU is an invertible 4×4 matrix. This assumption together with the property (48) of J-unitarity, imply the similarity of $T_L$ and $T_L^?$ $$T_L=V^{-1}T_L^?V, \qquad (66)$$

where V=JU. This relation imposes additional restrictions on the eigenvalues (59) for a given frequency ω and given ($k_x$, $k_y$)

$$\{k\}\equiv\{-k_i\},\ i=1,2,3,4. \qquad (67)$$

Relation (67) is referred to as the axial spectral symmetry, because in terms of the corresponding axial dispersion relation, it implies the equality (18) for every spectral branch.

If the sufficient condition (65) for the axial spectral symmetry is not in place, then for a given ω and ($k_x,k_y$)

$$\{k_i\}\neq\{-k_i\},\ i=1,2,3,4 \qquad (68)$$

which implies the axial spectral asymmetry (17).

The coefficients of the characteristic polynomial F(X) in Eq. (60) are functions of ω and ($k_x,k_y$). Let $F_0(X)$ be the characteristic polynomial at the stationary inflection point (16), where ω=$ω_0$ and ($k_x,k_y$)=($k_{0x}$, $k_{0y}$). The stationary inflection point (16) can also be defined as follows $$F_0(X)=0,\ F_0'(X)=0,\ F_0'(X)=0,\ F_0'''(X)\neq 0. \qquad (69)$$

This relation requires the respective value of $X_0$=exp(i$k_0$L) to be a triple root of the characteristic polynomial $F_0(X)$ implying $$F_0(X)=(X-X_1)(X-X_0)^3=0. \qquad (70)$$

A small deviation of the frequency ω from its critical value $ω_0$ changes the coefficients of the characteristic polynomial and removes the triple degeneracy of the solution $X_0$ $$X-X_0 \approx -6^{1/3}\left(\frac{\partial F_0/\partial \omega}{\partial^3 F_0/\partial X^3}\right)^{1/3}(\omega-\omega_0)^{1/3}\xi, \qquad (71)$$

$$\xi=1,\ e^{2\pi i/3},\ e^{-2\pi i/3}.$$

or, in terms of the axial quasimomentum k $$k-k_0 \approx 6^{1/3}\left(\frac{\omega-\omega_0}{\omega_0'''}\right)^{1/3}\xi,\ \xi=1,\ e^{2\pi i/3},\ e^{-2\pi i/3} \qquad (72)$$

where $$\omega_0'''=\left(\frac{\partial^3 \omega}{\partial k^3}\right)_{k_x,k_y}\bigg|_{\vec{k}=\vec{k}_0} > 0. \qquad (73)$$

The three solutions (72) can also be rearranged as $$\begin{cases} k_{ex}?k_0 + 6^{1/3}(\omega_0''')^{-1/3}(\omega-\omega_0)^{1/3}, \\ k_{ev}?k_0 + \frac{1}{2}(6)^{1/3}(\omega_0''')^{-1/3}(\omega-\omega_0)^{1/3} + \\ \quad i\frac{\sqrt{3}}{2}6^{1/3}(\omega_0''')^{-1/3}|\omega-\omega_0|^{1/3}, \\ k_{EV}?k_0 + \frac{1}{2}(6)^{1/3}(\omega_0''')^{-1/3}(\omega-\omega_0)^{1/3} - \\ \quad i\frac{\sqrt{3}}{2}6^{1/3}(\omega_0''')^{-1/3}|\omega-\omega_0|^{1/3}. \end{cases} \qquad (74)$$

The real $k_{ex}$ in Eq. (74) relates to the extended mode $\Psi_{ex}(z)$, with $u_z$=0 at ω=$ω_0$. The other two solutions, $k_{ev}$ and $k_{EV}=k_{ev}^*$, correspond to a pair of evanescent modes $\Psi_{ev}(z)$ and $\Psi_{EV}(z)$ with positive and negative infinitesimally small imaginary parts, respectively. Those modes are truly evanescent (i.e., have Im k≠0) only if ω≠$ω_0$, but it does not mean that at ω=$ω_0$, the eigenmodes $\Psi_{ev}(z)$ and $\Psi_{EV}(z)$ become extended.

With regard to eigenmodes at the frequency of AFM, consider the vicinity of stationary inflection point (13). As long as ω≠$ω_0$, the four eigenvectors (58) of the transfer matrix $T_L$ comprise two extended and two evanescent Bloch solutions. One of the extended modes (say, $\Phi_{k_1}$) corresponds to the non-degenerate real root $X_1=e^{ik_1L}$ of the characteristic equation (60). This mode has negative axial group velocity $u_z(k_1)$<0 and, therefore, is not of interest. The other three eigenvectors of $T_L$ correspond to three nearly degenerate roots (71). As ω approaches $ω_0$, these three eigenvalues become degenerate, while the respective three eigenvectors $\Phi_{k_2}$, $\Phi_{k_3}$, and $\Phi_{k_4}$ become collinear $$\Phi_{k_2}\rightarrow\alpha_1\Phi_{k_0},\ \Phi_{k_3}\rightarrow\alpha_2\Phi_{k_0},\ \Phi_{k_4}\rightarrow\alpha_3\Phi_{k_0},\ \text{as } \omega\rightarrow\omega_0. \qquad (75)$$

The latter important feature relates to the fact that at ω=$ω_0$, the matrix $T_L$ has a nontrivial Jordan canonical form $$U^{-1}T_LU = \begin{bmatrix} X_1 & 0 & 0 & 0 \\ 0 & X_0 & 1 & 0 \\ 0 & 0 & X_0 & 1 \\ 0 & 0 & 0 & X_0 \end{bmatrix},\ \text{at } \omega=\omega_0 \qquad (76)$$

and, therefore, cannot be diagonalized. It is has been shown that the very fact that the $T_L$ eigenvalues display the singularity (71), implies that at ω=$ω_0$ the matrix $T_L$ has the canonical form (76), see A. Figotin, and I. Vitebskiy. *Electromagnetic unidirectionality in magnetic photonic crystals.* Phys. Rev. B67, 165210 (2003), which is incorporated by reference herein as if set out in its entirety. In line with Eq. (75), the matrix $T_L$ from Eq. (76) has only two (not four) eigenvectors: (1) $\Phi_{k_1}=\Psi_{k_1}(0)$, corresponding to the non-degenerate root $X_1$ and relating to the extended mode with $u_z$<0; (2) $\Phi_{k_0}=\Psi_{k_0}(0)$, corresponding to the triple root $X_0$ and related to the AFM.

The other two solutions of the Maxwell equation (38) at ω=$ω_0$ are general Floquet eigenmodes, which do not reduce to the canonical Bloch form (54). Yet, they can be related to $\Psi_{k_0}(z)$. Indeed, following the standard procedure (see, R. Bellman. Introduction to Matrix Analysis. (SLAM. Philadelphia, 1997) and E. Coddington and R. Carlson. Linear Ordinary Differential Equations. (SIAM, Philadelphia, 1997), which are both incorporated by reference herein as if set out in their entirety), consider an extended Bloch solution $\Psi_k(z)$ of the reduced Maxwell equation (38)

$$L\Psi_k(z)=0, \qquad (77)$$

where $$L = \partial_z - i\frac{\omega}{c}M(z),$$

where both operators $M(z)$ and $L(z)$ are functions of $\omega$ and $(k_x,k_y)$. Assume now that the axial dispersion relation $\omega(k)$ has a stationary inflection point (13) at $k=k_0$. Differentiating Eq. (77) with respect to k at constant $(k_x,k_y)$ gives, with consideration for Eq. (13), $$L\partial_k\Psi_k(z)=0, \ L\partial_{kk}^2\Psi_k(z)=0, \text{ at } k=k_0.$$

This implies that at $k=k_0$, both functions $$\Psi_{01}(z)=\partial_k\Psi_k(z)|_{k=k_0}, \text{ and } \Psi_{02}(z)=\partial_{kk}^2\Psi_k(z)|_{k=k_0} \qquad (78)$$

are also eigenmodes of the reduced Maxwell equation at $\omega=\omega_0$. Representing $\Psi_k(z)$ in the form $$\Psi(z)=\psi_k(z)e^{ikz}, \qquad (79)$$

where $\Psi_k(z+L)=\psi_k(L)$, Im k=0 and substituting Eq. (79) into Eq. (78) one has $$\Psi_{01}(z)=\overline{\Psi}_{k_0}(z)+iz\Psi_{k_0}(z), \qquad (80)$$

$$\Psi_{02}(z)=\overline{\Psi}_{k_0}'(z)+iz\overline{\Psi}_{k_0}(z)-z^2\Psi_{k_0}(z), \qquad (81)$$

where $$\overline{\Psi}_{k_0}(z)=(\partial_k\psi_k(z))_{k=k_0}e^{ik_0z}$$

and $$\overline{\Psi}_{k_0}'(z)=(\partial_{kk}^2\psi_k(z))_{k=k_0}e^{ik_0z}$$

are auxiliary Bloch functions (not eigenmodes).

To summarize, at the frequency $\omega_0$ of AFM, there are four solutions for the reduced Maxwell equation (38)

$$\Psi_{k_1}(z), \Psi_{k_0}(z), \Psi_{10}(z), \Psi_{02}(z) \qquad (82)$$

The first two solutions from Eq. (82) are extended Bloch eigenmodes with $u_z<0$ and $u_z=0$, respectively. The other two solutions diverges as the first and the second power of z, respectively, they are referred to as general (non-Bloch) Floquet modes.

Deviation of the frequency $\omega$ from $\omega_0$ removes the triple degeneracy (76) of the matrix $T_L$, as seen from Eq. (71). The modified matrix $T_L$ can now be reduced to a diagonal form with the set (58) of four eigenvectors comprising two extended and two evanescent Bloch solutions.

In Section II, the relation between the symmetry of the axial dispersion relation of body 102, and the phenomenon of AFM was discussed. At this point it can be shown that the axial spectral asymmetry (17) is a necessary condition for the occurrence of the stationary inflection point and for the AFM associated with such a point. As discussed earlier in this Section, the stationary inflection point relates to a triple root of the characteristic polynomial F(X) from Eq. (60). Since F(X) is a polynomial of the fourth degree, it cannot have a symmetric pair of triple roots, that would have been the case for axially symmetric dispersion relation. Hence, only asymmetric axial dispersion relation $\omega(k)$ can display a stationary inflection point (13) or, equivalently, Eq. (16), as shown in FIG. 4B. In this respect, the situation with the AFM is somewhat similar to that of the frozen mode in unidirectional magnetic photonic crystals. The difference lies in the physical nature of the phenomenon. The bulk spectral asymmetry (24) leading to the effect of electromagnetic unidirectionality, essentially requires the presence of nonreciprocal magnetic materials. By contrast, the axial spectral asymmetry (17) along with the AFM regime can be realized in perfectly reciprocal periodic dielectric stacks with symmetric bulk dispersion relation (22). On the other hand, the axial spectral asymmetry can require an oblique light incidence, which is not needed for the bulk spectral asymmetry.

Another important symmetry consideration is that in the vicinity of the stationary inflection point (13), all four Bloch eigenmodes (58) must have the same symmetry, which means that all of them must belong to the same one-dimensional irreducible representation of the Bloch wave vector group. This condition is certainly met when the direction defined by $(n_x,n_y)$ is not special in terms of symmetry. One should consider what happens if the above condition is not in place. Consider the situation (31), when at any given frequency $\omega$ and fixed $(n_x,n_y)=(n_x,0)$, two of the Bloch eigenmodes are TE modes and the other two are TM modes. Note, that TE and TM modes belong to different one-dimensional representations of the Bloch wave vector group. In such a case, the transfer matrix $T_L$ can be reduced to the block-diagonal form $$T_L = \begin{bmatrix} T_{11} & T_{12} & 0 & 0 \\ T_{21} & T_{22} & 0 & 0 \\ 0 & 0 & T_{33} & T_{34} \\ 0 & 0 & T_{43} & T_{44} \end{bmatrix}.$$

The respective characteristic polynomial F(X) degenerates into $$F(X)=F_{TE}(X)F_{TM}(X) \qquad (83)$$

where $F_{TE}(X)$ and $F_{TM}(X)$ are independent second degree polynomials describing the TE and TM spectral branches, respectively. In such a situation, the transfer matrix cannot have the nontrivial canonical form (76), and the respective axial dispersion relation cannot develop a stationary inflection point (69), regardless of whether or not the axial spectral asymmetry is in place.

Section IV: the AFM Regime in a Semi-Infinite Stack

In vacuum the electromagnetic field $\Psi_V(z)$ is a superposition of the incident and reflected waves $$\Psi_V(z)=\Psi_I(z)+\Psi_R(z), \text{ at } z<0. \qquad (84)$$

At the boundary of body 102 one has $$\Psi_V(0)=\Psi_I(0)+\Psi_R(0)=\Psi_I+\Phi_R, \qquad (85) \text{ where}$$

$$\Phi_I = \begin{bmatrix} E_{I,x} \\ E_{I,y} \\ H_{I,x} \\ H_{I,y} \end{bmatrix} = \begin{bmatrix} E_{I,x} \\ E_{I,y} \\ -E_{I,x}n_xn_yn_z^{-1} - E_{I,y}(1-n_x^2)n_z^{-1} \\ E_{I,x}(1-n_y^2)n_z^{-1} + E_{I,y}n_xn_yn_z^{-1} \end{bmatrix}, \qquad (86)$$

-continued $$\Phi_R = \begin{bmatrix} E_{R,x} \\ E_{R,y} \\ H_{R,x} \\ H_{R,y} \end{bmatrix} = \begin{bmatrix} E_{R,x} \\ E_{R,y} \\ E_{R,x} n_x n_y n_z^{-1} + E_{R,y}(1-n_x^2) n_z^{-1} \\ -E_{R,x}(1-n_y^2) n_z^{-1} - E_{R,y} n_x n_y n_z^{-1} \end{bmatrix}.$$

The complex vectors $\vec{E}_I, \vec{H}_I$ and $\vec{E}_R, \vec{H}_R$ are related to the actual electromagnetic field components $E_I, H_I$ and $E_R, H_R$ as $$E_I = e^{ic\frac{\omega}{c}(n_x x + n_y y)} \vec{E}_I(z), \quad H_I = e^{ic\frac{\omega}{c}(n_x x + n_y y)} \vec{H}_I,$$

$$E_R = e^{ic\frac{\omega}{c}(n_x x + n_y y)} \vec{E}_R(z), \quad H_R = e^{ic\frac{\omega}{c}(n_x x + n_y y)} \vec{H}_R.$$

The transmitted wave $\Psi_T(z)$ inside body 102 is a superposition of two Bloch eigenmodes $$\Psi_T(z) = \Psi_1(z) + \Psi_2(z), \text{ at } z > 0. \tag{87}$$

The eigenmodes $\Psi_1(z)$ and $\Psi_2(z)$ can be both extended (with $u_x > 0$), one extended and one evanescent (with $u_x > 0$ and Im $k > 0$, respectively), or both evanescent (with Im $k > 0$), depending on which of the three cases (62), (63), or (64) are being dealt with. In particular, in the vicinity of the AFM (e.g., the vicinity of $\omega$ in FIG. 4B), situation (63) is presented. Therefore, in the vicinity of AFM, $\Psi_T(z)$ is a superposition of the extended eigenmode $\Psi_{ex}(z)$ with the group velocity $u_z > 0$, and the evanescent mode $\Psi_{ev}(z)$ with Im $k > 0$ $$\Psi_T(z) = \Psi_{ex}(z) + \Psi_{ev}(z), \text{ at } z > 0. \tag{88}$$

The asymptotic expressions for the respective wave vectors $k_{ex}$ and $k_{ev}$ in the vicinity of AFM are given in Eq. (74).

When the frequency $\omega$ exactly coincides with the frequency $\omega_0$ of the AFM, representation (88) for $\Psi_T(z)$ is not valid. In such a case, according to Eq. (74), there is no evanescent modes at all. It turns out that at $\omega = \omega_0$, the electromagnetic field inside the slab is a superposition of the extended mode $\Psi_{k_0}(z)$ and the (non-Bloch) Floquet eigenmode $\Psi_{01}(z)$ from Eq. (80)

$$\Psi_T(z) = \Psi_{k_0}(z) + \Psi_{01}(z), \text{ at } \omega = \omega_0 \text{ and } z > 0. \tag{89}$$

Since the extended eigenmode $\Psi_{k_0}(z)$ has zero axial group velocity $u_z$, it does not contribute to the axial energy flux $S_z$. By contrast, the divergent non-Bloch contribution $T_0$, (z) is associated with the finite axial energy flux $S_z > 0$, although the notion of group velocity does not apply here. The detailed analysis is carried out in the next subsection.

Knowing the eigenmodes inside body 102 and using the standard electromagnetic boundary conditions $$\Phi_T \pm \Psi_I + \Phi_R, \text{ where } \Phi = T(0), \tag{90}$$

one can express the amplitude and composition of the transmitted wave $\Psi_T$ and reflected wave $\Psi_R$, in terms of the amplitude and polarization of the incident wave $\Psi_I$. This gives the transmittance and reflectance coefficients (2) of body 102, as well as the electromagnetic field distribution $\Psi_T(z)$ inside body 102, as functions of the incident wave polarization, the direction $\vec{n}$ of incidence, and the frequency $\omega$.

With regard to the field amplitude inside body 102, the energy density flux must first be considered. The real-valued Poynting vector is defined by $$S(\vec{r}) = \frac{c}{8\pi} \text{Re}[E^*(\vec{r}) \times H(\vec{r})]. \tag{B1}$$

Substituting the representation (37) for $\vec{E}(\vec{r})$ and $\vec{H}(\vec{r})$ in Eq. (B1) yields $$S(\vec{r}) = S(z) = \frac{c}{8\pi} \text{Re}[\vec{E}^*(z) \times \vec{H}(z)] \tag{B2}$$

implying that none of the three Cartesian components of the energy density flux S depends on the transverse coordinates x and y. Energy conservation argument implies that the component $S_z$ of the energy flux does not depend on the coordinate z either, while the transverse components $S_x$ and $S_y$ may depend on z. Indeed, in the case of steady-state oscillations in a lossless medium, with consideration for Eq. (B2)

$$\nabla \cdot S = \partial_z S_z(z) = 0$$

which together with Eq. (B2) gives $$S_z(\vec{r}) = S_z = \text{const}, \quad S_x(\vec{r}) = S_x(z), \quad S_y(\vec{r}) = S_y(z) \tag{B3}$$

The explicit expression for the z component of the energy flux (B2) is $$S_z = \frac{1}{2}[E_x^* H_y - E_y^* H_x + E_x H_y^* - E_y H_x^*] = \frac{1}{2}(\Psi, J\Psi). \tag{B4}$$

The tangential components of the energy flux can also be expressed in terms of the column vector $\Psi(z)$ from Eq. (38). Using the expressions (40) for $E_z$ and $H_z$, and eliminating these field components from S(z) in Eq. (B2) yields $$S_x = \frac{1}{2}(\Psi, \hat{G}_x \Psi), \quad S_y = \frac{1}{2}(\Psi, \hat{G}_y \Psi), \tag{B5}$$

where $G_x$ and $G_y$ are Hermitian matrices $$G_x = \begin{bmatrix} 0 & -\frac{n_y}{\mu_{33}} & 0 & \frac{\varepsilon_{13}}{\varepsilon_{33}} \\ -\frac{n_y}{\mu_{33}} & 2\frac{n_x}{\mu_{33}} & -\frac{\mu_{13}^*}{\mu_{33}} & \frac{\varepsilon_{23}}{\varepsilon_{33}} - \frac{\mu_{23}^*}{\mu_{33}} \\ 0 & -\frac{\mu_{13}}{\mu_{33}} & 0 & -\frac{n_y}{\varepsilon_{33}} \\ \frac{\varepsilon_{13}^*}{\varepsilon_{33}} & \frac{\varepsilon_{23}^*}{\varepsilon_{33}} - \frac{\mu_{23}}{\mu_{33}} & -\frac{n_y}{\varepsilon_{33}} & 2\frac{n_x}{\varepsilon_{33}} \end{bmatrix},$$

$$G_y = \begin{bmatrix} 2\frac{n_y}{\mu_{33}} & -\frac{n_x}{\mu_{33}} & -\frac{\varepsilon_{13}}{\varepsilon_{33}} + \frac{\mu_{13}^*}{\mu_{33}} & \frac{\mu_{23}^*}{\mu_{33}} \\ -\frac{n_x}{\mu_{33}} & 0 & -\frac{\varepsilon_{23}}{\varepsilon_{33}} & 0 \\ -\frac{\varepsilon_{13}^*}{\varepsilon_{33}} + \frac{\mu_{13}}{\mu_{33}} & -\frac{\varepsilon_{23}^*}{\varepsilon_{33}} & 2\frac{n_y}{\mu_{33}} & -\frac{n_x}{\varepsilon_{33}} \\ \frac{\mu_{23}}{\mu_{33}} & 0 & -\frac{n_x}{\varepsilon_{33}} & 0 \end{bmatrix}.$$

Both $G_x$ and $G_y$ are functions of the Cartesian coordinate z, frequency $\omega$, and the direction $\vec{n}$ of incident wave propagation.

In what follows, for purposes of illustration, it is assumed that $\omega$ can be arbitrarily close but not equal to $\omega_0$, unless otherwise is explicitly stated. The transmitted wave $\omega_T(z)$ can then be treated as a superposition (88) of one extended and one evanescent mode. Since evanescent modes do not transfer energy in the z direction, the extended mode is solely responsible for the axial energy flux $S_z$ $$S_z(\Psi_T) = S_z(\Psi_{ex}). \quad (91)$$

According to Eq. (B3), $S_z$ does not depend on z and can be expressed in terms of the semi-infinite slab transmittance $\tau$ from Eq. (2)

$$S_z = \tau(\vec{S}_I) = \tau S_I, \quad (92)$$

where $S_I = (\vec{S}_I)_z$ is the axial energy flux of the incident wave, which is set to be unity.

The energy density $W_{ex}$ associated with the extended mode $\Psi_{ex}(z)$ can be expressed in terms of the axial component $u_z$ of its group velocity and the axial component $S_z(\Psi_{ex})$ of the respective energy density flux $$W_{ex} = u_z^{-1} S_z(\Psi_{ex}) = \left(\frac{\partial \omega}{\partial k}\right)_{k_x, k_y}^{-1} \tau S_I. \quad (93)$$

In close proximity of the AFM frequency $\omega_0$, one has according to Eq. (13)

$$\omega - \omega_0 \approx \frac{1}{6} \omega_0'''(k - k_0)^3, \quad (94)$$

where $\omega_0'''$ is defined in Eq. (73). Differentiating Eq. (94) with respect to k $$\left(\frac{\partial \omega}{\partial k}\right)_{k_x, k_y} \approx \frac{1}{2}\omega_0'''(k - k_0)^2 \approx \frac{6^{2/3}}{2}(\omega_0''')^{1/3}(\omega - \omega_0)^{2/3}, \quad (95)$$

and plugging Eq. (95) into Eq. (93) yields $$W_{ex} \approx \frac{2}{6^{2/3}} \tau S_I (\omega_0''')^{-1/3} (\omega - \omega_0)^{-2/3}, \quad (96)$$

where the transmittance $\tau$ depends on the incident wave polarization, the frequency $\omega$, and the direction of incidence $(n_x, n_y) = (ck_x/\omega, ck_y/\omega)$. Formula (96) implies that the energy density $W_{ex}$ and, therefore, the amplitude $|\Psi_{ex}(z)| = |\Phi_{ex}|$ of the extended mode inside the stack diverge in the vicinity of the AFM regime $$|\Phi_{ex}| \sim \sqrt{W_{ex}} \sim \sqrt{\tau S_I} (\omega_0''')^{-1/6} |\omega - \omega_0|^{-1/3} \text{ as } \omega \to \omega_0 \quad (97)$$

The divergence of the extended mode amplitude $|\Phi_{ex}|$ imposes the similar behavior on the amplitude $|\Psi_{ev}(0)| = |\Phi_{ev}|$ of the evanescent mode at the boundary of body 102. Indeed, the boundary condition (90) requires that the resulting field $\Phi_T = \Phi_{ex} + \Phi_{ev}$ remains limited to match the sum $\Phi_I + \Phi_R$ of the incident and reflected waves. Relation (90) together with (97) imply that there is a destructive interference of the extended $\Phi_{ex}$ and evanescent $\Phi_{ev}$ modes at the boundary $$\Phi_{ex} \approx -\Phi_{ev} \approx K\sqrt{\tau S_I}(\omega_0''')^{-1/6}(\omega - \omega_0)^{-1/3}\Phi_{k_0}, \omega \to \omega_0, \quad (98)$$

Here, $\Phi_{k_0}$ is the normalized eigenvector of $T_L$ in Eq. (76); K is a dimensionless parameter. Expression (98) is in compliance with the earlier made statement (75) that the column-vectors $\Phi_{ex}$ and $\Phi_{ev}$ become collinear as $\omega \to \omega_0$.

The amplitude $|\Psi_{ex}(z)|$ of the extended Bloch eigenmode remains constant and equal to $|\Phi_{ex}|$ from Eq. (97), while the amplitude of the evanescent contribution to the resulting field decays as $$|\Psi_{ev}(z)| = |\Phi_{ev}| e^{-z \text{Im} k_{ev}}, \text{ where} \quad (99)$$

$$\text{Im} k_{ev} \approx \frac{\sqrt{3}}{2} 6^{1/3} (\omega_0''')^{-1/3} |\omega - \omega_0|^{1/3}.$$

At $z >> (\text{Im} k_{ev})^{-1}$, the destructive interference (98) of the extended and evanescent modes becomes ineffective, and the only remaining contribution to $\Psi_T(z)$ is the extended mode $\Psi_{ex}(z)$ with huge and independent of z amplitude (97). This situation is graphically demonstrated in FIGS. 3A–C.

When the frequency $\omega$ tends to its critical value $\omega_0$, according to Eqs. (57) and (88), at z=NL, N=0, 1, 2, . . . , the resulting field $\Psi_T(z)$ inside body 102 can be represented as $$\Psi_T(z) = \Phi_{ex} e^{izk_{ex}} + \Phi_{ev} e^{izk_{ev}}, \quad (100)$$

Substituting $k_{ex}$ and $k_{ev}$ from Eq. (74) in Eq. (100), and taking into account the asymptotic relation (98), one has $$\Psi_T(z) \approx \left(\Phi_T + zK\sqrt{\frac{\tau S_I}{\omega_0'''}} 6^{1/3} \left(\frac{i}{2} + \frac{\sqrt{3}}{2} \frac{\omega - \omega_0}{|\omega - \omega_0|}\right) \Phi_{k_0}\right) e^{izk_0} \text{ as } \omega \to \omega_0. \quad (101)$$

Although this asymptotic formula is valid only for z=NL, N=0, 1, 2, . . . , it is consistent with the expression (80) for the non-Bloch solution $\Psi_{10}(z)$ of the Maxwell equation (38) at $\omega = \omega_0$.

The incident wave polarization affects the relative contributions of the extended and evanescent components to the resulting field $\Psi_T(z)$ in Eq. (88). In addition, it also affects the overall transmittance (2). The situation here is similar to that of the normal incidence. There are two special cases, merging into a single one as $\omega \to \omega_0$. The first one occurs when the elliptic polarization of the incident wave is chosen so that it produces a single extended eigenmode $\Psi_{ex}(z)$ inside body 102 (no evanescent contribution to $\Psi_T(z)$). In this case, $\Psi_T(z)$ reduces to $\Psi_{ex}(z)$, and its amplitude $|\Psi_T(z)|$ remains limited and independent of z. As $\omega$ approaches $\omega_0$, the respective transmittance $\tau$ vanishes in this case, and there is no AFM regime. The second special case is when the elliptic polarization of the incident wave is chosen so that it produces a single evanescent eigenmode $\Psi_{ev}(z)$ inside body 102 (no extended contribution to $\Psi_T(z)$). In such a case, $\Psi_T(z)$ reduces to $\Psi_{ev}(z)$, and the amplitude $|\Psi_T(z)|$ decays exponentially with z in accordance with Eq. (99). The respective transmittance $\tau$ in this latter case is zero regardless of the frequency $\omega$, because evanescent modes do not transfer energy. Importantly, as $\omega$ approaches $\omega_0$, the polarizations of the incident wave that produce either a sole extended or a sole evanescent mode become indistinguishable, in accordance with Eq. (75). In the vicinity of the AFM regime, the maximal transmittance $\tau$ is achieved for the incident wave polarization orthogonal to that exciting a single extended or evanescent eigenmode inside body 102.

The axial electromagnetic field distribution, as well as the axial energy flux $S_z$ inside body 102 occurs at the same time, in and near the AFM regime, as the stronger energy flux in the tangential direction.

The axial energy flux $S_z$ is exclusively provided by the extended contribution $\Psi_{ex}(z)$ to the resulting field $\Psi_T(z)$, because the evanescent mode $\Psi_{ev}(z)$ does not contribute to $S_z$. Neither $|\Psi_{ex}|$ nor $S_z$ depends on z (see Eq. (B3)). By contrast, both the extended and the evanescent modes determine the tangential energy flux $\vec{S}_\tau(z)$. Besides, according to Eq. (B3), the tangential energy flux depends on z. Far from the AFM regime, the role of the evanescent mode is insignificant, because $\Psi_{ev}(z)$ is appreciable only in a narrow region close to the boundary of body 102. But the situation appears quite different near the AFM frequency. Indeed, according to Eq. (99), the imaginary part of the respective Bloch wave vector $k_{ev}$ becomes infinitesimally small near the critical point. As a consequence, the evanescent mode extends deep inside body 102, so does its role in formation of $\vec{S}_\tau(z)$. The tangential energy flux $\vec{S}_\tau(z)$ as function of z can be directly obtained using formula (B5) and the explicit expression for $\Psi_T(z) = \Psi_{ex}(z) + \Psi_{ev}(z)$. Although the explicit expression for $\vec{S}_\tau(z)$ is rather complicated and cumbersome, it has very simple and transparent structure. Indeed, the tangential energy flux can be represented in the following form $$\vec{S}_\tau(z) = \vec{u}_\tau W(z),$$

where the tangential group velocity $\vec{u}_\tau$ behaves regularly at $\omega = \omega_0$. Therefore, the magnitude and the space distribution of the tangential energy flux $\vec{S}_\tau(z)$ in and near the AFM regime literally coincides with that of the electromagnetic energy density W(z), which is proportional to $|\Psi_T(z)|^2$. A typical picture of that is shown in FIG. 3A.

As seen in the previous Sections, a distinctive characteristic of the AFM regime is that the incident monochromatic radiation turns into a very unusual grazing wave inside body 102, as shown schematically in FIGS. 3 and 6. Such a grazing wave is significantly different from that occurring in the vicinity of the total internal reflection regime, where the transmitted wave also propagates along the interface. One difference is that near the regime of total internal reflection, the reflectivity approaches unity, which implies that the intensity of the transmitted (refracted) wave vanishes. By contrast, in the case of AFM the light reflection from the interface can be small, as shown in an example in FIG. 4A. Thus, in the AFM case, a significant portion of the incident light gets converted into the grazing wave (the AFM) with huge amplitude, compared to that of the incident wave. For this reason, the AFM regime can be of great utility in many applications as described above.

Another distinctive feature of the AFM regime relates to the field distribution inside the periodic medium. The electromagnetic field of the AFM can be approximated by a divergent Floquet eigenmode $\Psi_{10}(z)$ from Eq. (80), whose magnitude $|\Psi_{10}(z)|^2$ increases as $z^2$, until nonlinear effects or other limiting factors come into play. In fact, the field amplitude inside body 102 can exceed the amplitude of the incident plane wave by several orders of magnitude, depending on the quality of the periodic array, the actual number of the layers, and the width of the incident light beam.

Looking at the z component of light group velocity and energy flux, a dramatic slowdown of light in the vicinity of the AFM regime can be seen. In principle, there can be a situation when the tangential components $(u_x, u_y)$ of the group velocity also vanish in the AFM regime, along with the axial component $u_z$, if the physical parameters of the periodic array are chosen properly. In such a case, the AFM regime reduces to its particular case, the frozen mode regime with $\vec{u} = 0$ inside the periodic medium. This regime has the advantage that it is not related to the magnetic unidirectionality and, hence, there is no need to incorporate nonreciprocal magnetic layers in the periodic array. The latter circumstance allows the realization of the frozen mode regime at the infrared, optical, and UV frequency range.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A photonic device, comprising:
   a body having a front surface and a plurality of periodic segments physically coupled together along a first direction normal to the surface, the body being receptive to an electromagnetic wave incident at a second direction oblique to the first direction and having a first frequency, each segment comprising:
   a first anisotropic dielectric layer having an anisotropic axis at an angle oblique to the first direction; and
   a second layer;

wherein each segment is configured such that the received wave is transmittable within the body in an axially frozen mode.

2. The photonic device of claim 1, wherein the wave transmittable in the axially frozen mode has a reduced group velocity in the first direction, an increased energy flux in a direction tangential to the first direction and an increased amplitude.

3. The photonic device of claim 1, wherein the body is configured to receive a plurality of electromagnetic waves, each wave having a different frequency within a predetermined frequency range, and wherein the body is configured to convert each of the waves to the axially frozen mode when each wave is incident on the front surface in an oblique direction corresponding to the frequency of that wave.

4. The photonic device of claim 3, wherein the range of frequencies includes frequencies greater than 100 Gigahertz.

5. The photonic device of claim 1, wherein each layer of each segment is substantially lossless and/or substantially transparent to electromagnetic waves at the desired frequency range.

6. The photonic device of claim 1, wherein the second layer is an isotropic layer.

7. The photonic device of claim 1, wherein the second layer is an anisotropic layer.

8. The photonic device of claim 7, further comprising three or more layers in each segment, each segment being configured such that the received wave is transmittable within the body in an axially frozen mode.

9. The photonic device of claim 8, wherein the third layer is an isotropic layer.

10. The photonic device of claim 2, wherein the group velocity in the first direction is reduced by a factor up to and including three orders of magnitude.

11. The photonic device of claim 2, wherein the tangential energy flux is increased by a factor up to and including three orders of magnitude.

12. The photonic device of claim 1, wherein substantially the entire electromagnetic wave incident upon the surface is transmittable within the device in an axially frozen mode.

13. The photonic device of claim 3, further comprising a deflection device adjacent to the front surface and configured to deflect the incident electromagnetic wave at an angle based on the frequency of the wave.

14. The photonic device of claim 13, wherein the deflection device is oriented to allow for the incident electromagnetic wave to be deflected in the second direction.

15. The photonic device of claim 13, wherein the deflection device is configured to deflect a plurality of spectral components of the incident wave at different angles based on the respective frequencies of the spectral components.

16. The photonic device of claim 15, wherein the deflection device is oriented to deflect the plurality of spectral components such that they are incident on the front surface in different oblique directions, wherein each incident direction allows for the respective spectral component to be transmitted through the device in the axially frozen mode.

17. The device of claim 15, wherein the orientation of the deflection device is adjustable.

18. The device of claim 2, wherein the device is configured such that the received wave is transmitted within the device in a full frozen mode, wherein the wave transmitted in the full frozen mode is transmitted in the axially frozen mode and has a reduced group velocity in the tangential direction.

19. The photonic device of claim 2, wherein the length of each segment in the first direction is the same order of magnitude as the wavelength of the electromagnetic wave.

20. The photonic device of claim 19, wherein the axial length is at least ten periods.

21. The photonic device of claim 20, wherein the axial length is between ten and fifty periods.

22. The photonic device of claim 19, wherein the dimension of the cross section of the body is at least five wavelengths at a frequency of operation.

23. The photonic device of claim 7, wherein the second layer is composed of the same anisotropic material as the first layer and has a thickness along the first direction different from that of the first layer.

24. The photonic device of claim 7, wherein the second layer is composed of the same anisotropic material as the first layer and is oriented relative to the first layer such that the respective anisotropic axes of the first and the second layers are not coplanar with the first direction.

25. The photonic device of claim 7, wherein the second layer is composed of the same anisotropic material as the first layer and is oriented relative to the first layer such that the respective anisotropic axes make different angles with respect to the first direction.

26. A photonic device, comprising:
a body having a front surface and a plurality of segments physically coupled together forming a two dimensional periodic structure, the body being receptive to an electromagnetic wave having a first frequency, wherein the wave is incident on the front surface in a first direction normal to the front surface;
wherein each segment comprises at least two components each of which is substantially lossless over a frequency range including the first frequency, at least one of the components being an anisotropic dielectric layer and having an anisotropic axis oblique to the first direction, and wherein each segment is configured such that the received wave is transmittable within the body in an axially frozen mode.

27. The photonic device of claim 26, wherein the plurality of segments are coupled together forming a three dimensional structure.

28. The photonic device of claim 26, wherein the wave transmittable in the axially frozen mode has a reduced group velocity in the first direction, an increased energy flux in a direction tangential to the first direction and an increased amplitude.

* * * * *